United States Patent
Imai et al.

(10) Patent No.: US 9,596,427 B2
(45) Date of Patent: Mar. 14, 2017

(54) PROGRAM INFORMATION DISPLAYING PROGRAM AND PROGRAM INFORMATION DISPLAYING APPARATUS

(75) Inventors: Daiji Imai, Kyoto (JP); Ryoichiro Atono, Kai (JP)

(73) Assignees: NINTENDO CO., LTD., Kyoto (JP); HAL LABORATORY, INC., Tokyo (JP)

( * ) Notice: Subject to any disclaimer, the term of this patent is extended or adjusted under 35 U.S.C. 154(b) by 1949 days.

(21) Appl. No.: 12/369,107

(22) Filed: Feb. 11, 2009

(65) Prior Publication Data

US 2009/0208191 A1    Aug. 20, 2009

(30) Foreign Application Priority Data

Feb. 19, 2008 (JP) .................................. 2008-036944

(51) Int. Cl.
| | |
|---|---|
| H04N 5/44 | (2011.01) |
| H04N 5/445 | (2011.01) |
| H04N 21/431 | (2011.01) |
| H04N 21/45 | (2011.01) |
| H04N 21/475 | (2011.01) |
| H04N 21/482 | (2011.01) |

(52) U.S. Cl.
CPC ..... *H04N 5/44543* (2013.01); *H04N 21/4312* (2013.01); *H04N 21/4314* (2013.01); *H04N 21/4532* (2013.01); *H04N 21/4751* (2013.01); *H04N 21/482* (2013.01); *A63F 2300/409* (2013.01)

(58) Field of Classification Search
USPC .............................. 386/296, 297; 725/46, 47
See application file for complete search history.

(56) References Cited

U.S. PATENT DOCUMENTS

| | | | | |
|---|---|---|---|---|
| 5,978,043 | A * | 11/1999 | Blonstein et al. ............. | 348/569 |
| 7,065,777 | B2 * | 6/2006 | Inoue ............................. | 725/39 |
| 7,962,936 | B2 * | 6/2011 | Fukuda et al. ................ | 725/43 |
| 2002/0035727 | A1 | 3/2002 | Numata et al. | |
| 2003/0088872 | A1 * | 5/2003 | Maissel et al. ................ | 725/46 |
| 2005/0257130 | A1 * | 11/2005 | Ito .............................. | 715/500.1 |
| 2006/0020973 | A1 * | 1/2006 | Hannum et al. ................ | 725/46 |
| 2007/0186241 | A1 * | 8/2007 | Sugimoto et al. ............. | 725/46 |

(Continued)

FOREIGN PATENT DOCUMENTS

| | | |
|---|---|---|
| JP | 11-187324 | 7/1999 |
| JP | 2001-119639 | 4/2001 |

(Continued)

*Primary Examiner* — Victor Lesniewski
(74) *Attorney, Agent, or Firm* — Nixon & Vanderhye P.C.

(57) ABSTRACT

A program information displaying apparatus includes a CPU, and displays a plurality of program information in tabular form. For example, users register accounts as user information in the program information that the user is interested in. A priority and a display manner are set for each of the plurality of accounts, and the program information in which the account is registered is depicted in the display manner on the basis of the priority. When a first depicting method is selected, the program information is depicted in a display manner of the account with the highest priority. When a second depicting method is selected, the program information is depicted such that the display manners are layered in order of the priority.

14 Claims, 19 Drawing Sheets

(56) References Cited

U.S. PATENT DOCUMENTS

| 2009/0064230 A1* | 3/2009 | Hung ............................ 725/47 |
| 2009/0070812 A1 | 3/2009 | Sasaki et al. |
| 2009/0133069 A1* | 5/2009 | Conness et al. ................ 725/46 |
| 2009/0133070 A1* | 5/2009 | Hamano et al. ................ 725/46 |

FOREIGN PATENT DOCUMENTS

| JP | 2002-094893 | 3/2002 |
| JP | 2005-244869 | 9/2005 |
| JP | 2008-011428 | 1/2008 |
| WO | 2005-015902 | 2/2005 |
| WO | 2007-099803 | 9/2007 |

\* cited by examiner

PROGRAM INFORMATION DISPLAYING PROGRAM AND PROGRAM INFORMATION DISPLAYING APPARATUS

CROSS REFERENCE OF RELATED APPLICATION

The disclosure of Japanese Patent Application No. 2008-36944 is incorporated herein by reference.

FIELD

The technology herein relates to a program information displaying program and a program information displaying apparatus. More specifically, the technology herein relates to a program information displaying program and a program information displaying apparatus capable of displaying a plurality of program information in tabular form.

BACKGROUND AND SUMMARY

Conventionally, in a program information displaying apparatus for displaying a program guide of a TV, etc., some apparatuses allowing capable of easily confirming a program that the users are interested in have been known.

For example, a Japanese Patent Laid-open No. 11-187324 [H04N 5/44, H04H 7/00, H04N 5/262] (Patent Document 1) discloses that program information is searched according to the condition, such as a fee for a program, a genre, a residence, an objective gender, an objective age, etc., and the search result is displayed within the program guide as user-specified-channel (my channel). In a case that a plurality of program information in the same time slot satisfy the search condition, a plurality of my channels are displayed. Furthermore, this also discloses that the program selected as a search result may be discriminated from the programs which have not been selected with change in color or font.

Additionally, in a Japanese Patent Application Laid-Open No. 2001-119639 [H04N 5/445, 7/173] (Patent Document 2) discloses that when a user view a program guide and makes a specific check with respect to the program that he or she is interested in, the checked program is displayed at a specific area ("My program" display area) of the program guide.

However, in the above-described patent documents 1 and 2, the program that the user searches or checks is displayed in an area different from the program guide, and this causes problems that a further space for display is required, and a displayable range of the program guide is narrowed. Furthermore, there is a problem that it is difficult to intuitively know the correspondence, such as at which position of the program guide the program that the user searches or checks is positioned. It should be noted that the Patent Document 1 discloses that the program that the user searches may be displayed so as to be discriminated from the other programs by changing a color or font, but if a plurality of users perform searches or checks, it fails to disclose how to display them.

Therefore, it is a primary object of certain example embodiments to provide a novel program information displaying program and a novel program information displaying apparatus.

Another object of certain example embodiments is to provide a program information displaying program and a program information displaying apparatus capable depicting each program information on the basis of the priority of the user information registered in the program information.

Other object of certain example embodiments is to provide a program information displaying program and a program information displaying apparatus capable of readily displaying the user information registered in the program information.

Certain example embodiments employ the following features in order to solve the above-described problems. It should be noted that reference numerals and the supplements inside the parentheses show one example of a corresponding relationship with the embodiments described later for easy understanding of certain embodiments, and do not limit the present invention.

A first embodiment is a storage medium storing a program information displaying program so as to be read by a computer of a program information displaying apparatus which displays a plurality of program information in tabular form, and the program information displaying program causes a computer to execute a priority setting step, a user information registering step, and a depicting step. The priority setting step sets respective priorities of a plurality of user information. The user information registering step makes a registration of any one of the plurality of user information with respect to any one of the plurality of program information. The depicting step depicts each program information on the basis of the priority of the user information registered in the program information.

In the first embodiment, a program information displaying program is executed by a computer (40, 42b) of a program information displaying apparatus (10, 12) to display a plurality of program information in tabular form, that is, as a program guide. The plurality of program information displayed as a program guide are shared by a plurality of users. For example, user information, such as an account of each user is registered and stored. In a priority setting step (S1, S7-S11), respective priorities of a plurality of user information are set. For example, a priority table showing priorities of the respective user information is generated. In a user information registering step (S13-S15), a registration of any one of the plurality of user information is made with respect to any one of the plurality of program information. For example, user information is registered in the program information that the user is interested in by an operation of the user, and program registration data in which the program information and the registered user information are associated with each other is generated. In a depicting step (S19), each program information is depicted on the basis of the priority of the user information registered in the program information. The priority of the user information registered in each program information is grasped on the basis of the registered program data and the priority table, for example. By this depicting, the program information in which the registered user information is represented on the basis of the priorities is displayed.

According to the first embodiment, the program information in which the user information is registered is depicted on the basis of the priority of the user information registered in this program information, and therefore, the user information registered in each program information are depicted in this program information on the basis of the priorities. Furthermore, in the plurality of program information displayed in tabular form, each program information is depicted on the basis of the priority of the user information registered in this program information, and therefore, it is possible to readily display the user information registered in the program information.

A second embodiment is a storage medium according to the first embodiment, and the program information displaying program causes the computer to further execute a user information displaying step for displaying the plurality of user information as a plurality of corresponding icons. The priority setting step includes a determining step for determining whether or not any one of the plurality of icons is designated, and a priority changing step for changing the priority such that the priority of the user information respectively corresponding to the designated icon is made highest when the determining step determines that any one of the icons is designated.

In the second embodiment, in a user information displaying step (S3, S83), a plurality of icons (800) respectively corresponding to the plurality of user information are displayed. In a determining step (S7), it is determined whether or not any one of the plurality of icons is designated. For example, the determination is performed on the basis of the display position data of the icons and input data by the user, to specify the icon designated by the user. In a priority changing step (S9-S11), the priority is changed such that the priority of the user information corresponding to the designated icon is the highest. Thus, in a depicting step, the program information is depicted on the basis of the changed priority.

According to the second embodiment, it is possible to change the priority of the user information. Specifically, by instructing or designating the icon corresponding to the user information, the priority of the user information is changed to be the highest, so that, it is possible to change the priority of desired user information so as to become the highest. Accordingly, by changing the priority of the user information in response to the icon being designated, it is possible to give a change to the display of the program information in which this user information is registered, and it is possible for the user to easily know that in which program information the desired user information is registered.

A third embodiment is a storage medium according to the first or the second embodiment, different display manners are respectively set to the plurality of user information, and the depicting step depicts the program information in the display manner determined on the basis of the priority of the user information.

Here, different display manners are set to respective user information. In a depicting step (S67, S75-S77), the program information is depicted in the display manner determined on the basis of the priority of the user information. Thus, it is possible to display the program information having the display manner on the basis of the priority of the registered user information.

Accordingly, by the display manner of the program information, it is possible to represent the registered user information, and moreover realize a display according to the priority of this registered user information.

A fourth embodiment is a storage medium according to the third embodiment, and the display manner is a color or a design.

Here, different colors or designs are set to respective user information. Accordingly, the program information is depicted in color or design on the basis of the priorities of the user information. Accordingly, by the color or the design of the program information, it is possible to readily display the registered user information on the basis of the priorities.

A fifth embodiment is a storage medium according to the third or the fourth embodiments, and the depicting step depicts the program information in the display manner set to the user information with the highest priority out of the user information registered in the program information.

In certain example embodiments, in a depicting step (S67), the program information in which the user information is registered is depicted in the display manner set to the user information with the highest priority. Thus, it is possible to easily confirm the registration condition of the user information with the highest priority by the display manner of the program information, such as a color, a design, a font, etc. In addition, in combination of the second embodiment, the priority of the user information corresponding to the designated icon is changed so as to become the highest, and therefore, when a desired icon is designated, the program information in which the user information corresponding to this icon is registered is depicted in the display manner set to this user information. Thus, by changing the user information to be designated, it is possible to switch and display the registration condition of the user information with the highest priority, which allows the user to easily know the registration condition of the desired user information.

A sixth embodiment is a storage medium according to the fourth embodiment, and the depicting step depicts the program information such that the display manners set to the respective user information are layered in order of the priority of the user information registered in the program information.

In the sixth embodiment, in a depicting step (S75-S77), the program information in which user information are registered is depicted such that the display manners set to the respective user information are layered in order of the priority of the user information registered in the program information. Thus, by the colors or the designs being made up of layered body as a display manner at the program information, it is easily confirm how many user information is registered in this program information, and it is also possible to easily confirm the priorities of the respective user information by a layering order of the colors or designs.

A seventh embodiment is a storage medium according to the fourth embodiment, and the program information displaying program causes the computer to further execute a depicting method selecting step for selecting a depicting method of the program information. The depicting step depicts the program information in the display manner set to the user information with the highest priority out of the user information registered in the program information when the depicting method selecting step selects a first depicting method, and depicts the program information such that the display manners set to the user information are layered in order of the priority of the user information registered in the program information when the depicting method selecting step selects a second depicting method.

In the seventh embodiment, in a depicting method selecting step (S17), a depicting method of the program information is selected. For example, in response to an operation by the user, the display method is selected. In a case of a first depicting method, the program information in which the user information is registered is depicted in the display manner set to the user information with the highest priority. In a case of a second depicting method, the program information in which the user information is registered is depicted such that objects having the display manners set to the user information are layered in order of decreasing priority of the user information registered in the program information.

According to the seventh embodiment, it is possible to select whether or not the user information with the highest priority is displayed, or whether or not all the user information are displayed in order of the priorities out of the user information registered in each program information.

An eighth embodiment is a storage medium according to the seventh embodiment, and the depicting step forms an object having the display manner set to the user information having the highest priority and being made equal in height to the other program information when the first depicting method is selected, and forms a layered body in which objects having display manners set to the user information are layered in order of the priority from a top as the program information in which the user information are registered when the second depicting method is selected.

In the eighth embodiment, in a case of the first depicting method, the respective program information are formed in the objects having the same height, and as the program information in which the user information are registered, an object having the display manner set to the user information having the highest priority is formed. Furthermore, in a case of the second depicting method, as the program information in which user information are registered, a layered body in which objects having display manners set to the user information are layered in order of the priority from a top as the program information is formed. Accordingly, it is possible to easily execute depicting the program information by the first depicting method and the second depicting method.

A ninth embodiment is a program information displaying apparatus displaying a plurality of program information in tabular form, which comprises a priority setting means, a user information registering means, and a depicting means. The priority setting means sets respective priorities of a plurality of user information. The user information registering means makes a registration of any one of the plurality of user information with respect to any one of the plurality of program information. The depicting means depicts each program information in which the user information is registered on the basis of the priority of the user information registered in the program information.

The ninth embodiment is a program information displaying apparatus corresponding to the program information displaying program of the first embodiment, and has an advantage the same as the above-described first embodiment.

A tenth embodiment is a program information display method for displaying a plurality of program information in tabular form, and includes following steps of: a priority setting step for setting respective priorities of a plurality of user information; a user information registering step for making a registration of any one of the plurality of user information with respect to any one of the plurality of program information; and a depicting step for depicting each program information on the basis of the priority of the user information registered in the program information.

The tenth embodiment is a program information display method corresponding to the storage medium storing a program information displaying program of the first embodiment, and the program information displaying apparatus of the ninth embodiment, and has advantages similar to those of the above-described first embodiment and ninth embodiment.

According to certain example embodiments, it is possible to depict each program information on the basis of the priority of the user information registered in this program information. If a plurality of user information are registered in the program information, the user information registered in the program information are depicted on the basis of the priorities, and therefore, it is possible to readily display the user information registered in the program information, and easily understand the registration condition of the user information with respect to this program information.

The above described objects and other objects, features, aspects and advantages of embodiment will become more apparent from the following detailed description when taken in conjunction with the accompanying drawings.

DETAILED DESCRIPTION

Figure 1:
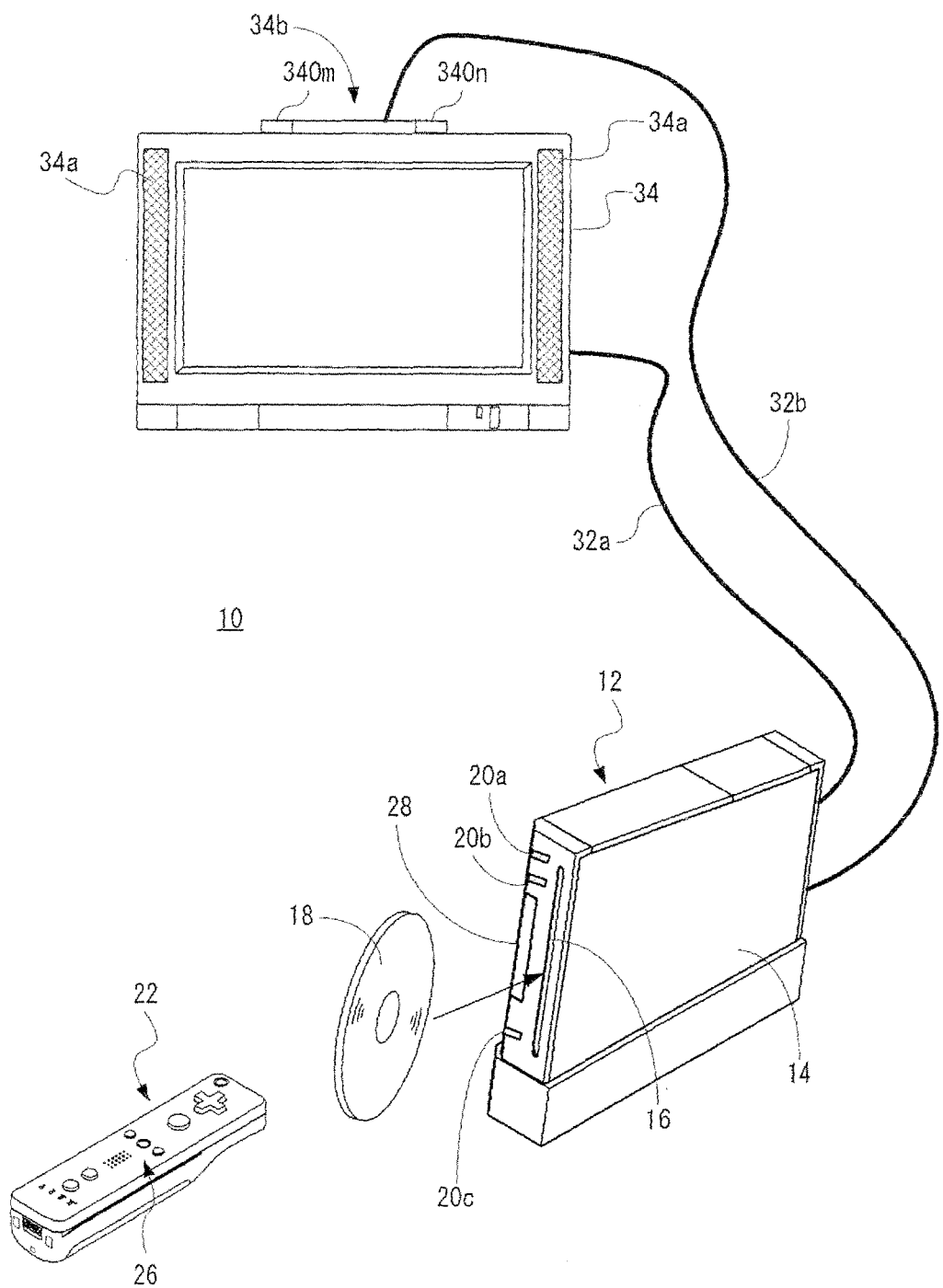
FIG. 1 is an illustrative view showing a game system of one embodiment.

Referring to FIG. 1, a game system 10 according to certain example embodiments includes a video game apparatus (hereinafter, simply referred to as "game apparatus") 12 and a controller 22. Although illustration is omitted, the game apparatus 12 of this embodiment is designed such that it can be connected to four controllers 22 at the maximum.

Furthermore, the game apparatus 12 and the respective controllers 22 are connected by radio. The wireless communication is executed according to a Bluetooth (registered trademark) standard, for example, but may be executed by other standards such as infrared rays, a wireless LAN. Alternatively, they may be connected by wire.

It should be noted that in this embodiment, a case that the information processing apparatus 10 according to this embodiment is constructed by utilizing a console game apparatus 12 to be used at home shown in FIG. 1 is explained, but in another embodiment, other computers, such as a personal computer, a cellular phone, a mobile information terminal, etc. may be utilized.

The game apparatus 12 includes a roughly rectangular parallelepiped housing 14, and the housing 14 is furnished with a disk slot 16 on a front surface. An optical disk 18 as one example of an information storage medium storing a game program, etc. is inserted from the disk slot 16 to be loaded into a disk drive 54 (see FIG. 2) within the housing 14. Around the disk slot 16, an LED and a light guide plate are arranged so as to be light on or off in accordance with various processing.

Furthermore, on a front surface of the housing 14 of the game apparatus 12, a power button 20a and a reset button 20b are provided at the upper part thereof, and an eject button 20c is provided below them. In addition, a connector cover for external memory card 28 is provided between the reset button 20b and the eject button 20c, and in the vicinity of the disk slot 16. Inside the connector cover for external memory card 28, a connector for external memory card 62 (see FIG. 2) is provided, through which an external memory card (hereinafter simply referred to as a "memory card") not shown is inserted. The memory card is employed for loading the game program, etc. read from the optical disk 18 to temporarily store it, storing (saving) game data (result data or proceeding data of the game) of the game played by means of the game system 10, and so forth. Here, storing the game data described above may be performed on an internal memory, such as a flash memory 44 (see FIG. 2) provided inside the game apparatus 12 in place of the memory card. Also, the memory card may be utilized as a backup memory of the internal memory.

It should be noted that a general-purpose SD card can be employed as a memory card, but other general-purpose memory cards, such as memory sticks, multimedia cards (registered trademark) can be employed.

The game apparatus 12 has an AV cable connector 58 (see FIG. 2) on the rear surface of the housing 14, and by utilizing the AV cable connector 58, a monitor 34 and a speaker 34a are connected to the game apparatus 12 through an AV cable 32a. The monitor 34 and the speaker 34a are typically a color television receiver, and through the AV cable 32a, a video signal from the game apparatus 12 is input to a video input terminal of the color television, and a sound signal from the game apparatus 12 is input to a sound input terminal thereof. Accordingly, a game image of a three-dimensional (3D) video game, for example, is displayed on the screen of the color television (monitor) 34, and stereo game sound, such as a game music, a sound effect, etc. is output from right and left speakers 34a. Around the monitor 34 (on the top side of the monitor 34, in this embodiment), a marker unit 34b including two infrared ray LEDs (markers) 340m and 340n is provided. The marker unit 34b is connected to the game apparatus 12 through a power source cable 32b. Accordingly, the marker unit 34b is supplied with power from the game apparatus 12. Thus, the markers 340m and 340n emit lights so as to output infrared rays in front of the monitor 34.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

In the game system 10, a user or a player turns the power of the game apparatus 12 on for playing the game (or applications other than the game). Then, the user selects an appropriate optical disk 18 storing a program of a video game (or other applications the player wants to play), and loads the optical disk 18 into the disk drive 54 of the game apparatus 12. In response thereto, the game apparatus 12 starts to execute a video game or other applications on the basis of the program recorded in the optical disk 18. The user operates the controller 22 in order to apply an input to the game apparatus 12. For example, by operating any one of the operating buttons of the input means 26, a game or other application is started. Besides the operation performed on the input means 26, by moving the controller 22 itself, it is possible to move a moving image object (player object) in different directions or change the perspective of the user (camera position) in a three-dimensional game world.

Furthermore, the programs and data of the game or other applications may be stored in advance in an internal memory like the flash memory 44 (FIG. 2) of the game apparatus 12, or downloaded from a download server on a network so as to be additionally stored in the internal memory.

Figure 2:
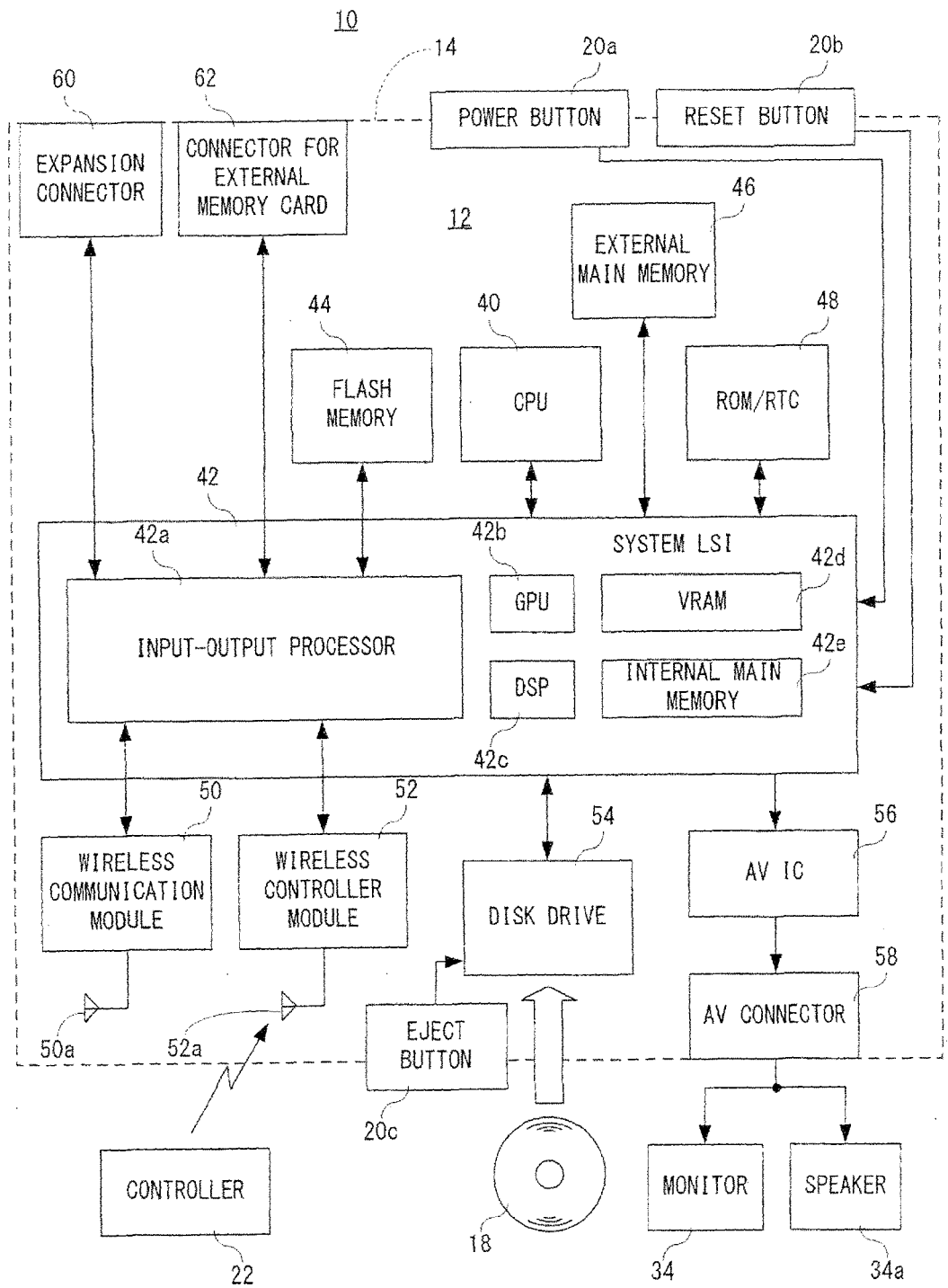
FIG. 2 is a block diagram showing an electric configuration of the game system shown in FIG. 1.

FIG. 2 is a block diagram showing an electric configuration of the video game system 10 shown in FIG. 1 embodiment. Although illustration is omitted, respective components within the housing 14 are mounted on a printed board. As shown in FIG. 2, the game apparatus 12 has a CPU 40. The CPU 40 functions as a game processor. The CPU 40 is connected with a system LSI 42. The system LSI 42 is connected with an external main memory 46, a ROM/RTC 48, a disk drive 54, and an AV IC 56.

The external main memory 46 is utilized as a work area and a buffer area of the CPU 40 by storing programs like a game program, etc. and various data. The ROM/RTC 48, which is a so-called boot ROM, is incorporated with a program for activating the game apparatus 12, and is provided with a time circuit for counting a time. The disk drive 54 reads program data, texture data, etc. from the optical disk 18, and writes them in an internal main memory 42e described later or the external main memory 46 under the control of the CPU 40.

The system LSI 42 is provided with an input-output processor 42a, a GPU (Graphics Processor Unit) 42b, a DSP (Digital Signal Processor) 42c, a VRAM 42d and an internal main memory 42e, and these are connected with one another by internal buses although illustration is omitted.

The input-output processor (I/O processor) 42a executes transmission and reception of data and executes download of the data.

The GPU 42b is made up of a part of a depicting means, and receives a graphics command (construction command) from the CPU 40 to generate game image data according to the command. Additionally, the CPU 40 applies an image generating program required for generating game image data to the GPU 42b in addition to the graphics command.

Although illustration is omitted, the GPU 42b is connected with the VRAM 42d as described above. The GPU 42*b* accesses the VRAM 42*d* to acquire data (image data: data such as polygon data, texture data, etc.) required to execute the construction command. Here, the CPU 40 writes image data required for depicting to the VRAM 42*d* via the GPU 42*b*. The GPU 42*b* accesses the VRAM 42*d* to create game image data for depicting.

In this embodiment, a case that the GPU 42*b* generates game image data is explained, but in a case of executing an arbitrary application except for the game application, the GPU 42*b* generates image data as to the arbitrary application.

Furthermore, the DSP 42*c* functions as an audio processor, and generates audio data corresponding to a sound, a voice, music, or the like to be output from the speaker 34*a* by means of the sound data and the sound wave (tone) data stored in the internal main memory 42*e* and the external main memory 46.

The game image data and audio data which are generated as described above are read by the AV IC 56, and output to the monitor 34 and the speaker 34*a* via the AV connector 58. Accordingly, a game screen is displayed on the monitor 34, and a sound (music) necessary for the game is output from the speaker 34*a*.

Furthermore, the input-output processor 42*a* is connected with a flash memory 44, a wireless communication module 50 and a wireless controller module 52, and is also connected with an expansion connector 60 and a connector for external memory card 62. The wireless communication module 50 is connected with an antenna 50*a*, and the wireless controller module 52 is connected with an antenna 52*a*.

The input-output processor 42*a* can communicate with other game apparatuses and various servers to be connected to a network via a wireless communication module 50. It should be noted that it is possible to directly communicate with another game apparatus without going through the network. The input-output processor 42*a* periodically accesses the flash memory 44 to detect the presence or absence of data (referred to as data to be transmitted) being required to be transmitted to a network, and transmits it to the network via the wireless communication module 50 and the antenna 50*a* in a case that data to be transmitted is present. Furthermore, the input-output processor 42*a* receives data (referred to as received data) transmitted from another game apparatuses via the network, the antenna 50*a* and the wireless communication module 50, and stores the received data in the flash memory 44. In a certain case, the reception data is abandoned as it is. In addition, the input-output processor 42*a* receives data (download data) downloaded from the download server via the network, the antenna 50*a* and the wireless communication module 50, and stores the download data in the flash memory 44.

Furthermore, the input-output processor 42*a* receives input data transmitted from the controller 22 via the antenna 52*a* and the wireless controller module 52, and (temporarily) stores it in the buffer area of the internal main memory 42*e* or the external main memory 46. The input data is erased from the buffer area after being utilized in game processing by the CPU 40.

In this embodiment, as described above, the wireless controller module 52 makes communications with the controller 22 in accordance with Bluetooth standards.

In addition, the input-output processor 42*a* is connected with the expansion connector 60 and the connector for external memory card 62. The expansion connector 60 is a connector for interfaces, such as USB, SCSI, etc., and can be connected with medium such as an external storage and peripheral devices such as another controller. Furthermore, the expansion connector 60 is connected with a cable LAN adaptor, and can utilize the cable LAN in place of the wireless communication module 50. The connector for external memory card 62 can be connected with an external storage like a memory card. Thus, the input-output processor 42*a*, for example, accesses the external storage via the expansion connector 60 and the connector for external memory card 62 to store and read the data.

Although a detailed description is omitted, as shown in FIG. 1, the game apparatus 12 (housing 14) is furnished with the power button 20*a*, the reset button 20*b*, and the eject button 20*c*. The power button 20*a* is connected to the system LSI 42. When the power button 20*a* is turned on, the system LSI 42 sets a mode of a normal energized state (referred to as "normal mode") in which the respective components of the game apparatus 12 are supplied with power through an AC adapter not shown. On the other hand, when the power button 20*a* is turned off, the system LSI 42 sets a mode in which a part of the components of the game apparatus 12 is supplied with power, and the power consumption is reduced to minimum (hereinafter referred to as "standby mode"). In this embodiment, in a case that the standby mode is set, the system LSI 42 issues an instruction to stop supplying the power to the components except for the input-output processor 42*a*, the flash memory 44, the external main memory 46, the ROM/RTC 48 and the wireless communication module 50, and the wireless controller module 52. Accordingly, the standby mode is a mode in which the CPU 40 never executes an application.

Although the system LSI 42 is supplied with power even in the standby mode, the GPU 42*b*, the DSP 42*c* and the VRAM 42*d* are stopped to be supplied with clocks so as not to be driven, realizing reduction in power consumption.

Although illustration is omitted, inside the housing 14 of the game apparatus 12, a fan is provided for excluding heat of the IC, such as the CPU 40, the system LSI 42, etc. to outside. In the standby mode, the fan is also stopped.

However, in a case that the standby mode is not desired to be utilized, when the power button 20*a* is turned off, by making the standby mode unusable, the power supply to all the circuit components are completely stopped.

Furthermore, switching between the normal mode and the standby mode can be performed by turning on and off the power switch 26*h* of the controller 22 by remote control. If the remote control is not performed, setting is made such that the power supply to the wireless controller module 52*a* is not performed in the standby mode.

The reset button 20*b* is also connected with the system LSI 42. When the reset button 20*b* is pushed, the system LSI 42 restarts the activation program of the game apparatus 12. The eject button 20*c* is connected to the disk drive 54. When the eject button 20*c* is pushed, the optical disk 18 is removed from the disk drive 54.

Figure 3:
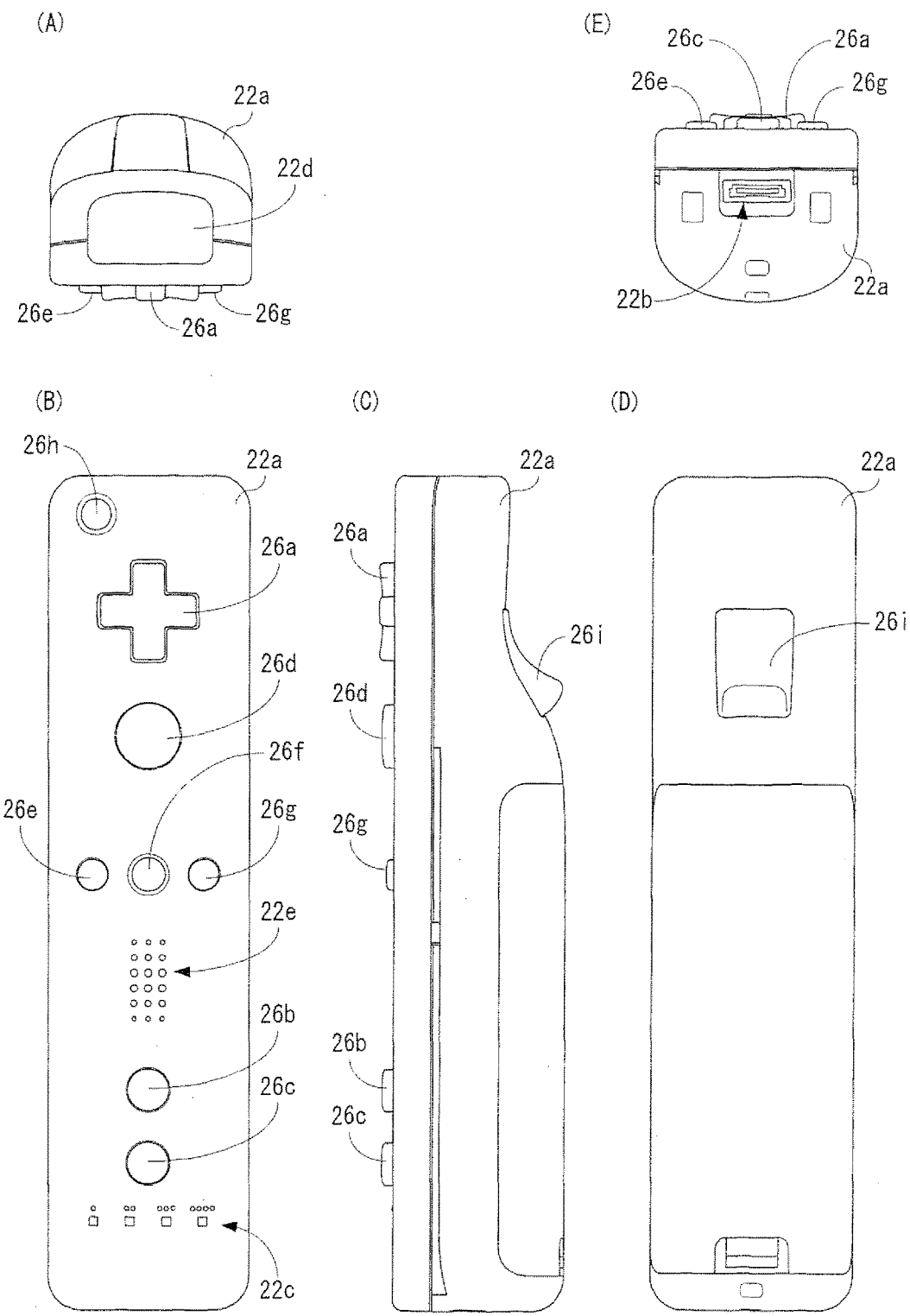
FIG. 3 is an illustrative view showing an external view of a controller shown in FIG. 1.

Each of FIG. 3 (A) to FIG. 3 (E) shows one example of an external appearance of the controller 22. FIG. 3 (A) shows a front end surface of the controller 22, FIG. 3 (B) shows a top surface of the controller 22, FIG. 3 (C) shows a right side surface of the controller 22, FIG. 3 (D) shows a lower surface of the controller 22, and FIG. 3 (E) shows a back end surface of the controller 22.

Referring to FIG. 3 (A) and FIG. 3 (E), the controller 22 has a housing 22*a* formed by plastic molding, for example. The housing 22*a* is formed into an approximately rectangular parallelepiped shape and has a size small enough to be held by one hand of a user. The housing 22*a* (controller 22) is provided with the input means (a plurality of buttons or switches) 26. Specifically, as shown in FIG. 3 (B), on an upper face of the housing 22a, there are provided a cross key 26a, a 1 button 26b, a 2 button 26c, an A button 26d, a − button 26e, a HOME button 26f, a + button 26g and a power switch 26h. Moreover, as shown in FIG. 3 (C) and FIG. 3 (D), an inclined surface is formed on a lower surface of the housing 22a, and a B-trigger switch 26i is formed on the inclined surface.

The cross key 26a is a four-directional-push switch, including four directions of front (or upper), back (or lower), right and left operation parts indicated by arrows. By operating any one of the operation parts, it is possible to instruct a moving direction of a character or object (player character or player object) that is be operable by a player or instruct a moving direction of a cursor.

The 1 button 26b and the 2 button 26c are respectively push button switches, and are used for a game operation, such as adjustment of a viewpoint position and a viewpoint direction on displaying the 3D game image, i.e. a position and an image angle of a virtual camera, and the like. Alternatively, the 1 button 26b and the 2 button 26c can be used for the same operations as those of the A-button 26d and the B-trigger switch 26i or an auxiliary operation.

The A-button switch 26d is the push button switch, and is used for causing the player character or the player object to take an action other than that instructed by a directional instruction, specifically arbitrary actions, such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine the weapon and command, and so forth.

The − button 26e, the HOME button 26f, the + button 26g, and the power supply switch 26h are also push button switches. The − button 26e is used for selecting a game mode. The HOME button 26f is used for displaying a game menu (menu screen). The + button 26g is used for starting (re-starting) or pausing the game. The power supply switch 26h is used for turning on/off a power supply of the game apparatus 12 by remote control.

In this embodiment, note that the power supply switch for turning on/off the controller 22 itself is not provided, and the controller 22 is set at on-state by operating any one of the switches or buttons of the input means 26 of the controller 22, and when not operated for a certain period of time (30 seconds, for example) or more, the controller 22 is automatically set at off-state.

The B-trigger switch 26i is also the push button switch, and is mainly used for inputting like a trigger such as shooting and designating a position selected by the controller 22. In a case that the B-trigger switch 26i is continued to be pushed, it is possible to make movements and parameters of the player object constant. In a fixed case, the B-trigger switch 26i functions in the same way as a normal B-button, and is used for canceling the action determined by the A-button 26d.

As shown in FIG. 3 (E), an external expansion connector 22b is provided on a back end surface of the housing 22a, and as shown in FIG. 3 (B), an indicator 22c is provided on the top surface and at the rear of the housing 22a. The external expansion connector 22b is utilized for connecting another expansion controller not shown. The indicator 22c is made up of four LEDs, for example, and shows identification information (controller number) of the controller 22 corresponding to the lighting LED by lighting any one of the four LEDs, and shows the remaining amount of power of the controller 22 depending on the number of LEDs to be emitted.

In addition, the controller 22 has an imaged information arithmetic section 80 (see FIG. 4), and is provided with a light incident opening 22d of the imaged information arithmetic section 80 on the front end surface of the housing 22a as shown in FIG. 3 (A). Furthermore, the controller 22 has a speaker 86 (see FIG. 4), and the speaker 86 is provided inside the housing 22a at the position corresponding to a sound release hole 22e between the 1 button 26b and the HOME button 26f on the tope surface of the housing 22a as shown in FIG. 3 (B).

Note that, the shape of the controller 22 and the shape, number and setting position of each input means 26 shown in FIG. 3 (A) to FIG. 3 (E) are simply examples, and needless to say, even if they are suitably modified, other embodiments can be realized.

Figure 4:
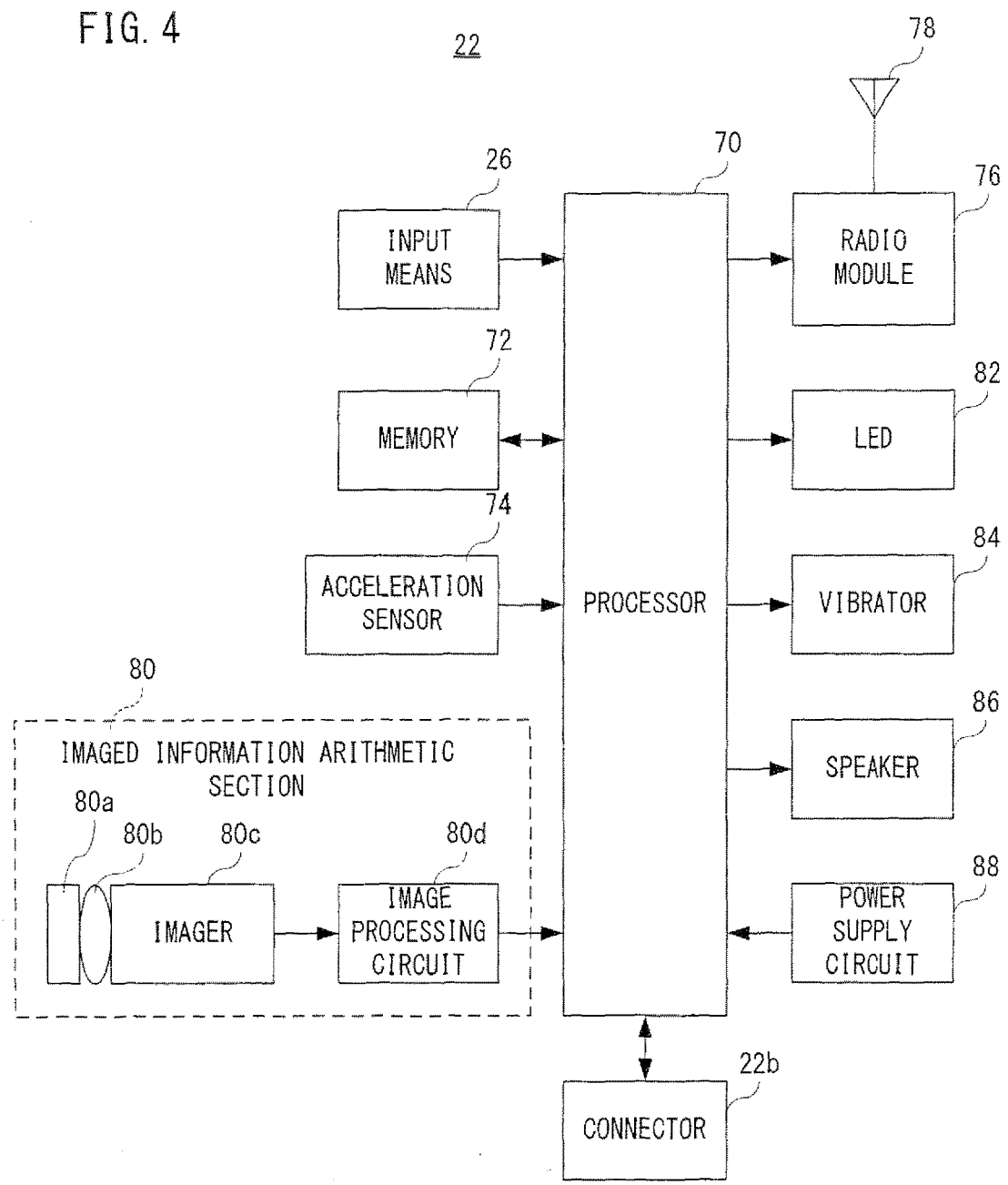
FIG. 4 is a block diagram showing an electric configuration of the controller shown in FIG. 3.

FIG. 4 is a block diagram showing an electric configuration of the controller 22. Referring to FIG. 4, the controller 22 includes a processor 70, and the processor 70 is connected with the external expansion connector 22b, the input means 26, a memory 72, an acceleration sensor 74, a radio module 76, the imaged information arithmetic section 80, an LED 82 (the indicator 22c), a vibrator 84, a speaker 86, and a power supply circuit 88 by an internal bus (not shown). Moreover, an antenna 78 is connected to the radio module 76.

The processor 70 is in charge of an overall control of the controller 22, and transmits (inputs) information (input information) inputted by the input means 26, the acceleration sensor 74, and the imaged information arithmetic section 80 as input data, to the game apparatus 12 via the radio module 76 and the antenna 78. At this time, the processor 70 uses the memory 72 as a working area or a buffer area.

An operation signal (operation data) from the aforementioned input means 26 (26a to 26i) is input to the processor 70, and the processor 70 stores the operation data once in the memory 72.

Moreover, the acceleration sensor 74 detects each acceleration of the controller 22 in directions of three axes of vertical direction (y-axial direction), lateral direction (x-axial direction), and forward and rearward directions (z-axial direction). The acceleration sensor 74 is typically an acceleration sensor of an electrostatic capacity type, but the acceleration sensor of other type may also be used.

For example, the acceleration sensor 74 detects the accelerations (ax, ay, and az) in each direction of x-axis, y-axis, z-axis for each first predetermined time, and inputs the data of the acceleration (acceleration data) thus detected to the processor 70. For example, the acceleration sensor 74 detects the acceleration in each direction of the axes in a range from −2.0 g to 2.0 g (g indicates a gravitational acceleration. The same thing can be the hereafter.) The processor 70 detects the acceleration data given from the acceleration sensor 74 for each second predetermined time, and stores it in the memory 72 once. The processor 70 creates input data including at least one of the operation data, acceleration data and marker coordinate data as described later, and transmits the input data thus created to the game apparatus 12 for each third predetermined time (5 msec, for example).

In this embodiment, although omitted in FIG. 3 (A) to FIG. 3 (E), the acceleration sensor 74 is provided on the circuit board at a position corresponding to the place where the cross key 26a is arranged inside the housing 22a.

It will be appreciated by those skilled in the art from the description of this specification that a computer, such as a processor (CPU 40, for example) of the game apparatus 12 or the processor (processor 70, for example) of the controller 22 executes processing on the basis of acceleration data output from the acceleration sensors 74 to thereby estimate or calculate (determine) more information relating to the controller 22.

In a case that processing is executed on the side of the computer assuming that the controller 22 incorporated with the single axis acceleration sensor 74 is in a static state, that is, processing is executed considering that accelerations detected by the acceleration sensor 74 is only gravitational accelerations, if the controller 22 is actually in a static state, it is possible to know whether or not the orientations of the controller 22 is inclined with respect to the direction of gravity or to what extent they are inclined on the basis of the detected acceleration. More specifically, when a state in which the detection axis of the acceleration sensor 74 is directed to a vertically downward direction is taken as a reference, merely whether or not 1 G (gravitational acceleration) is imposed on can show whether or not the controller 22 is inclined, and the size can show to what extent it is inclined.

Furthermore, if a multi-axes acceleration sensor 74 is applied, by further performing processing on acceleration data of each axis, it is possible to more precisely know to what extent the controller 22 is inclined with respect to the direction of gravity. In this case, on the basis of outputs from the acceleration sensor 74, the processor 70 may perform processing of calculating data of inclined angle of the controller 22, but perform processing of estimating an approximate inclination on the basis of the outputs from the acceleration sensor 74 without performing the processing of calculating the data of the inclined angle. Thus, by using the acceleration sensor 74 in conjunction with the processor 70, it is possible to determine an inclination, an orientation or a position of the controller 22.

On the other hand, assuming that the acceleration sensor 74 is in a dynamic state, accelerations according to the movement of the acceleration sensor 74 is detected in addition to the gravitational acceleration component, and therefore, if the gravitational acceleration component is removed by predetermined processing, it is possible to know a moving direction, etc. More specifically, in a case that the controller 22 being furnished with the acceleration sensor 74 is accelerated and moved by the hand of the user, acceleration data generated by the acceleration sensor 74 is processed, and whereby, it is possible to calculate various movements and/or positions of the controller 22.

Additionally, even when the acceleration sensor 74 is in a dynamic state, if an acceleration in correspondence with the movement of the acceleration sensor 74 is removed by the predetermined processing, it is possible to know the inclination with respect to the direction of gravity. In another embodiment, the acceleration sensor 74 may contain a built-in signal processing apparatus or other kinds of dedicated processing apparatuses for performing desired processing on the acceleration signal (acceleration data) output from the incorporated acceleration detecting means before outputting the acceleration data to the processor 70. For example, in a case that the acceleration sensor 74 is one for detecting a static acceleration (gravitational acceleration, for example), the built-in or dedicated processing apparatuses may be one for transforming the detected acceleration data into the inclined angle (or other preferable parameters) corresponding thereto.

The radio module 76 modulates a carrier of a predetermined frequency by the input data by using a technique of Bluetooth, for example, and emits its weak radio wave signal from the antenna 78. Namely, the input data is modulated to the weak radio wave signal by the radio module 76 and transmitted from the antenna 78 (controller 22). The weak radio wave signal thus transmitted is received by the radio controller module 52 provided to the aforementioned game apparatus 12. The weak radio wave thus received is subjected to demodulating and decoding processing. This makes it possible for the game apparatus 12 (CPU 40) to acquire the input data from the controller 22. Then, the CPU 40 performs game processing, following the obtained input data and a program (game program or application program).

In addition, as described above, the controller 22 is provided with the imaged information arithmetic section 80. The imaged information arithmetic section 80 is made up of an infrared rays filter 80*a*, a lens 80*b*, an imager 80*c*, and an image processing circuit 80*d*. The infrared rays filter 80*a* passes only infrared rays from the light incident from the front of the controller 22. As described above, the markers 340*m* and 340*n* placed near (around) the display screen of the monitor 34 are infrared LEDs for outputting infrared lights forward the monitor 34. Accordingly, by providing the infrared rays filter 80*a*, it is possible to image the image of the markers 340*m* and 340*n* more accurately. The lens 80*b* condenses the infrared rays passing thorough the infrared rays filter 80*a* to emit them to the imager 80*c*. The imager 80*c* is a solid imager, such as a CMOS sensor and a CCD, for example, and images the infrared rays condensed by the lens 80*b*. Accordingly, the imager 80*c* images only the infrared rays passing through the infrared rays filter 80*a* to generate image data. Hereafter, the image imaged by the imager 80*c* is called an "imaged image". The image data generated by the imager 80*c* is processed by the image processing circuit 80*d*. The image processing circuit 80*d* calculates a position of an object to be imaged (markers 340*m* and 340*n*) within the imaged image, and outputs each coordinate value indicative of the position to the processor 70 as imaged data for each fourth predetermined time. It should be noted that a description of the process in the image processing circuit 80*d* is made later.

Figure 5:
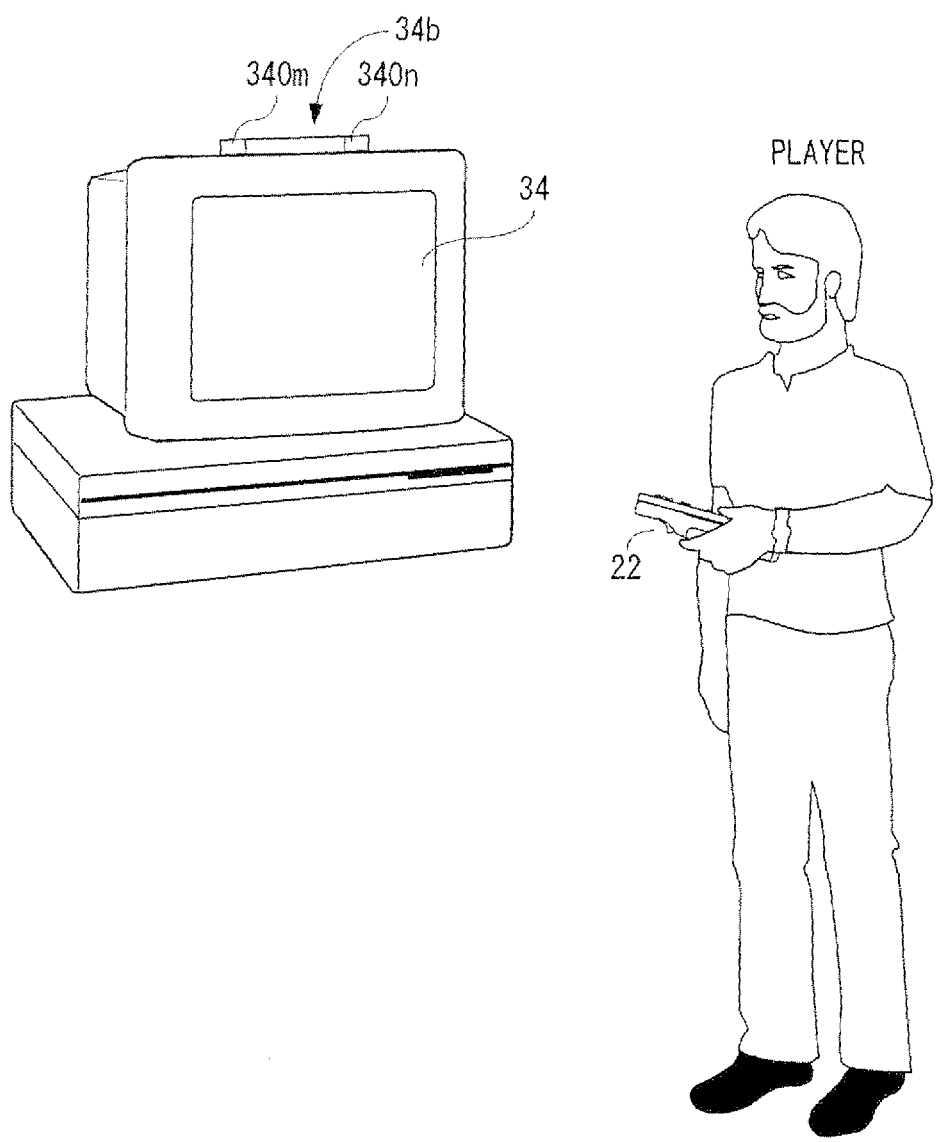
FIG. 5 is an illustrative view showing a situation in which a game is played by utilizing the controller shown in FIG. 1.

FIG. 5 is an illustrative view summarizing a state when a player plays a game by utilizing a controller 22. As shown in FIG. 5, when playing the game by means of the controller 22 in the video game system 10, the player holds the controller 22 with one hand. Strictly speaking, the player holds the controller 22 in a state that the front end surface (the side of the incident light opening 22*d* of the light imaged by the imaged information arithmetic section 80) of the controller 22 is oriented to the markers 340*m* and 340*n*. It should be noted that as can be understood from FIG. 1, the markers 340*m* and 340*n* are placed in parallel with the horizontal direction of the screen of the monitor 34. In this state, the player performs a game operation by changing a position on the screen indicated by the controller 22, and changing a distance between the controller 22 and each of the markers 340*m* and 340*n*.

Figure 6:
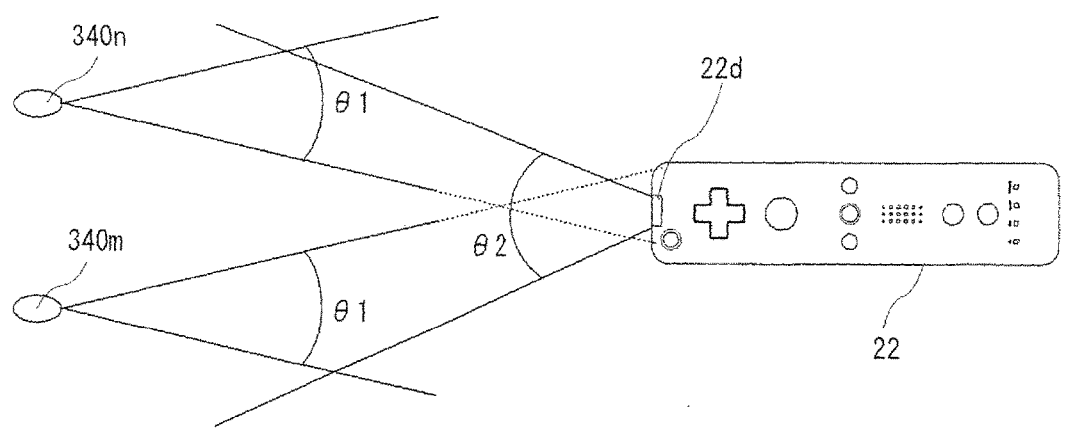
FIG. 6 is an illustrative view explaining makers and viewing angles of the controller shown in FIG. 1.

FIG. 6 is a view showing viewing angles between the respective markers 340*m* and 340*n*, and the controller 22. As shown in FIG. 6, each of the markers 340*m* and 340*n* emits infrared ray within a range of a viewing angle θ1. Also, the imager 80*c* of the imaged information arithmetic section 80 can receive incident light within the range of the viewing angle θ2 taking the line of sight of the controller 22 as a center. For example, the viewing angle θ1 of each of the markers 340*m* and 340*n* is 34° (half-value angle) while the viewing angle θ2 of the imager 80*c* is 41°. The player holds the controller 22 such that the imager 80*c* is directed and positioned so as to receive the infrared rays from the two markers 340*m* and 340*n*. More specifically, the player holds the controller 22 such that at least one of the markers 340*m* and 340*n* exists in the viewing angle θ2 of the imager 80*c*, and the controller 22 exists in at least one of the viewing angles θ1 of the marker 340*m* or 340*n*. In this state, the controller 22 can detect at least one of the markers 340*m* and 340*n*. The player can perform a game operation by changing the position and the orientation of the controller 22 in the range satisfying the state.

If the position and the orientation of the controller 22 are out of the range, the game operation based on the position and the orientation of the controller 22 cannot be performed. Hereafter, the above-described range is called an "operable range."

Figure 7:
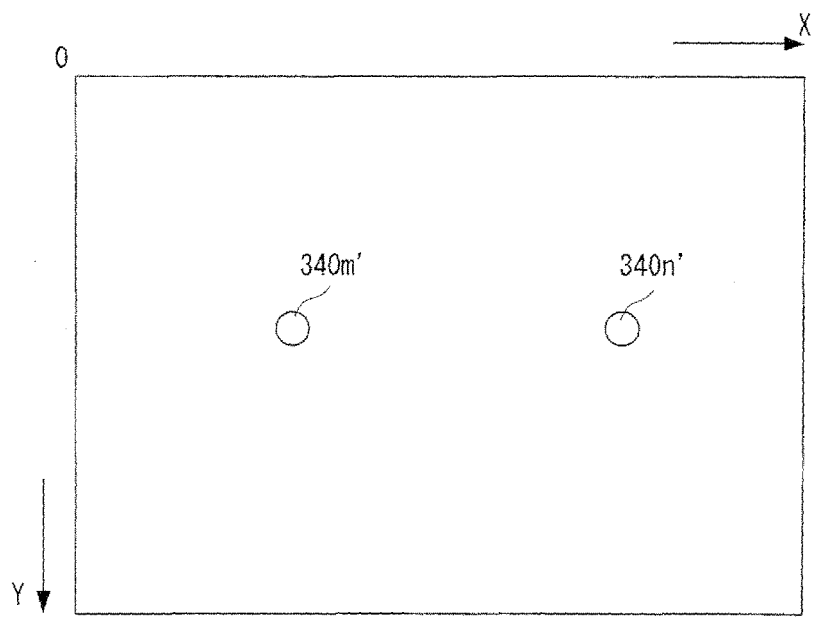
FIG. 7 is an illustrative view showing one example of an imaged image including objective images.

If the controller 22 is held within the operable range, an image of each of the markers 340*m* and 340*n* is imaged by the imaged information arithmetic section 80. That is, the imaged image obtained by the imager 80*c* includes an image (object image) of each of the markers 340*m* and 340*n* as an object to be imaged. FIG. 7 is a view showing one example of the imaged image including object images. The image processing circuit 80*d* calculates coordinates (marker coordinates) indicative of the position of each of the markers 340*m* and 340*n* in the imaged image by utilizing the image data of the imaged image including the object images.

Since the object image appears as a high-intensity part in the image data of the imaged image, the image processing circuit 80*d* first detects the high-intensity part as a candidate of the object image. Next, the image processing circuit 80*d* determines whether or not the high-intensity part is an object image on the basis of the size of the detected high-intensity part. The imaged image may include images other than the object image due to sunlight through a window and light of a fluorescent lamp in the room as well as the images 340*m'* and 340*n'* of the two markers 340*m* and 340*n* as an object image. The determination processing whether or not the high-intensity part is an object image is executed for discriminating the images 340*m'* and 340*n'* of the two markers 340*m* and 340*n* as an object image from the images other than them, and accurately detecting the object image. More specifically, in the determination process, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 80*d* calculates the position of the high-intensity part. More specifically, the barycenter position of the high-intensity part is calculated. Here, the coordinates of the barycenter position are called a "marker coordinate". Also, the barycenter position can be calculated with more detailed scale than the resolution of the imager 80*c*. Now, the resolution of the imaged image imaged by the imager 80*c* shall be 126×96, and the barycenter position shall be calculated with the scale of 1024×768. That is, the marker coordinate is represented by the integer from (0, 0) to (1024, 768).

Additionally, the position in the imaged image shall be represented by a coordinate system (XY coordinate system) taking the upper left of the imaged image as an origin point, the downward direction as an Y-axis positive direction, and the right direction as an X-axis positive direction.

Also, if the object image is properly detected, two high-intensity parts are determined as object images by the determination process, and therefore, two marker coordinates are calculated. The image processing circuit 80*d* outputs data indicative of the calculated two marker coordinates. The data (marker coordinate data) of the output marker coordinates is included in the input data by the processor 70 as described above, and transmitted to the game apparatus 12.

The game apparatus 12 (CPU 40) detects the marker coordinate data from the received input data to thereby calculate an instructed position (instructed coordinate) by the controller 22 on the screen of the monitor 34 and distances from the controller 22 to the respective markers 340*m* and 340*n* on the basis of the marker coordinate data. More specifically, from the position of the mid point of the two marker coordinates, a position to which the controller 22 faces, that is, an instructed position is calculated. The distance between the object images in the imaged image is changed depending on the distance between the controller 22 and each of the markers 340*m* and 340*n*, and therefore, the game apparatus 12 can grasp the distance between the controller 22 and each of the markers 340*m* and 340*n* by calculating the distance between the two marker coordinates. Thus, the controller 22 has a function as a pointing device for designating an arbitrary position on the display screen.

The game system 10 is a program information displaying apparatus 10 for displaying a plurality of program information in tabular form. That is, a program guide application is executed to display a program guide including a plurality of program information on the monitor 34. This program guide can be shared among a plurality of users, such as a family, and so on. Each user can register user information in program information that he or she is interested in, such as program information he or she wants to watch by utilizing the controller 22. At this time, a plurality of user information can be registered in the same program information. Accordingly, in a case that a plurality of user information are registered in the same program information, how to display the plurality of user information is required to be contrived. In this program information displaying apparatus 10, priority is set to each of the plurality of user information, and each program information is depicted on the basis of the priority of the user information registered in the program information. Thus, the user information registered in the program information can be readily represented according to the priority in this program information. This makes it possible to readily display the user information registered in the program information, allowing the user to easily grasp a registration condition of each user information with respect to the program information.

Figure 8:
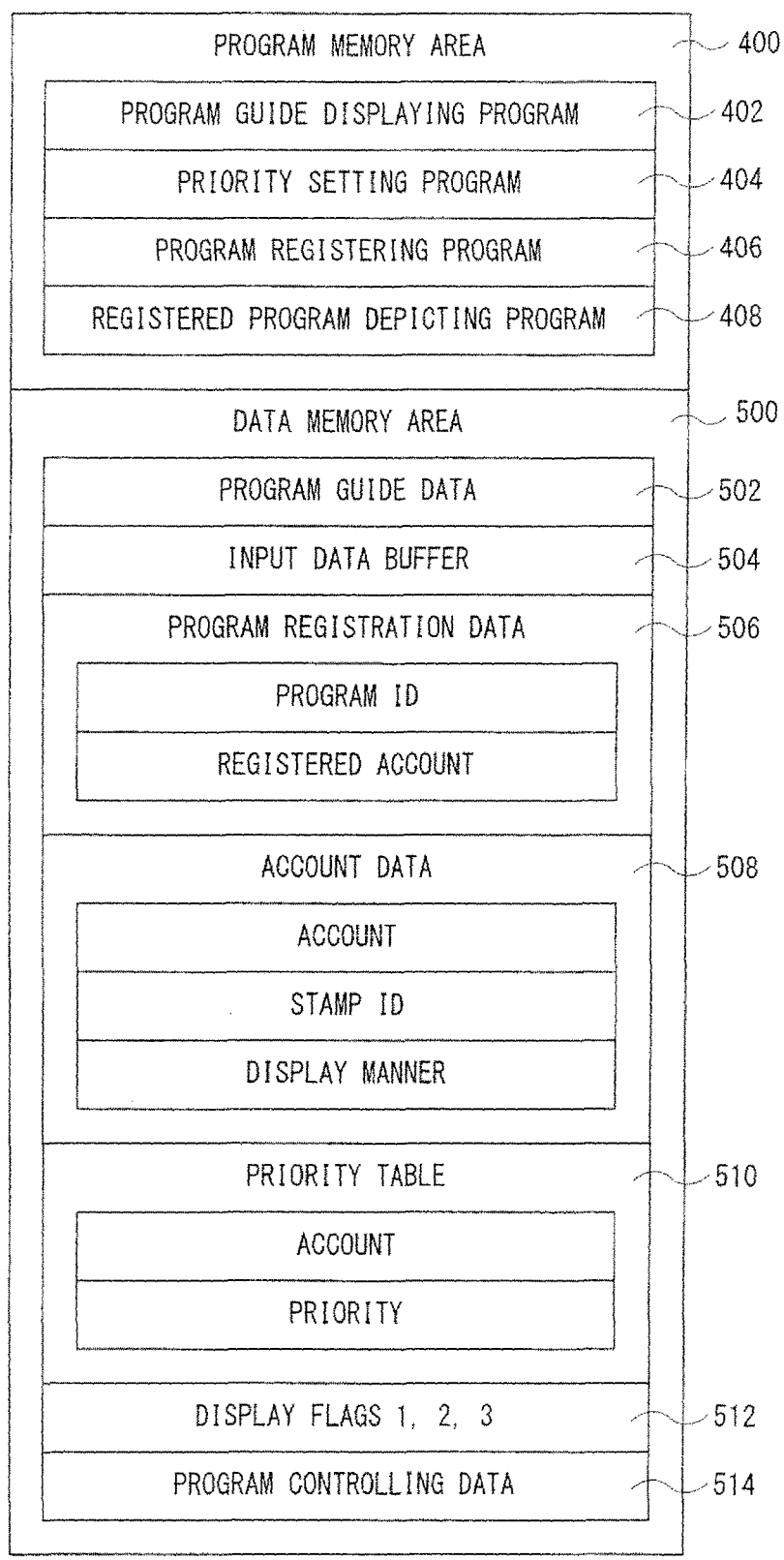
FIG. 8 is an illustrative view showing a memory map of the game apparatus shown in FIG. 1.

FIG. 8 shows one example of a memory map of the game apparatus 12. The memory map includes a program memory area 400 and a data memory area 500. A program information displaying program and data are read from the optical disk 18 entirely at a time, or partially and sequentially as necessary so as to be stored into the external memory 46 or the internal memory 42*e*. Furthermore, in the data memory area 500, data generated or fetched by the processing is also stored.

Furthermore, FIG. 8 shows only a part of the memory map, in which other programs and data necessary for processing are also stored. For example, sound data for outputting a sound such as a voice, a sound effect, music, etc., image data for generating a screen, a sound outputting program, an image generating and displaying program, etc. are read from the optical disk 18, and stored in the data memory area 500 or the program memory area 400. It should be noted that in this embodiment, programs and data are read from the optical disk 18, but in another embodiment, programs and data stored in advance in a nonvolatile storage medium such as the flash memory 44, etc. incorporated in the game apparatus 12 or programs or data downloaded via the network may be read so as to be stored in the external memory 46 or the internal memory 42*e*.

Figure 9:
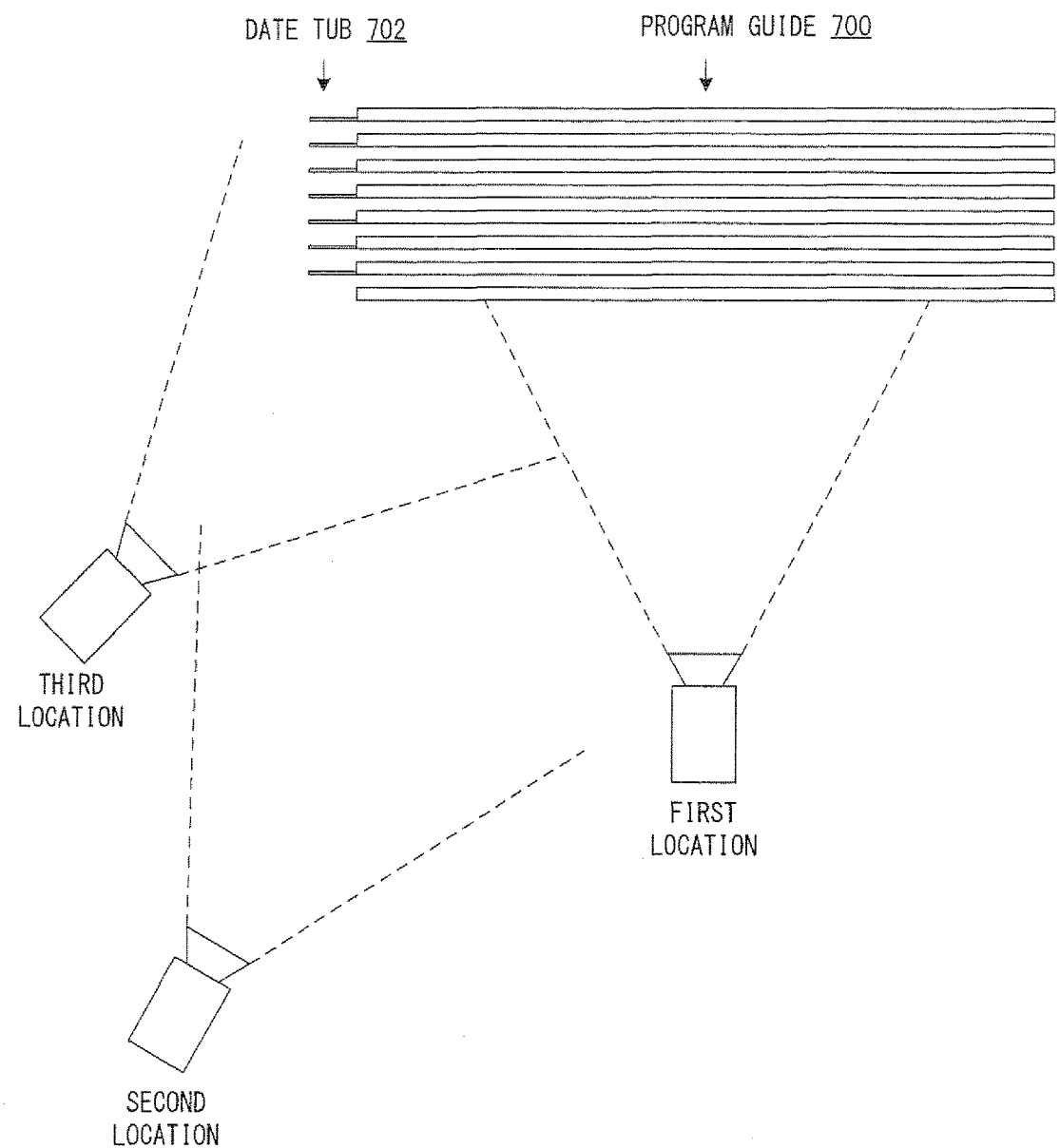
FIG. 9 is an illustrative view showing positional relationships between a program guide in a virtual three-dimensional space and virtual cameras.

A memory area 402 of the program memory area 400 stores a program guide displaying program. This program is for generating a screen including a program guide and displaying the same on the monitor 34. In this embodiment, when the screen for program guide is generated, a program guide arranged in a virtual three-dimensional space is depicted by the virtual camera. FIG. 9 shows a program guide (inclusively indicated by a reference numeral "700") in the virtual three-dimensional space and virtual cameras. The program guide 700 includes a plurality of plates (rectangular parallelepipeds). In this embodiment, as described above, a plurality of program information of the program guide data are classified for each date to display the program guide for each date, and therefore, the program guide for each date is represented by a sheet of plate. Furthermore, the program guides 700 for predetermined days (eight days, in this embodiment) are displayed, so that a plurality sheets of plates (eight sheets in this embodiment) are arranged in parallel with each other at predetermined intervals.

As seen from the virtual camera, the forefront plate viewed from the virtual camera is a program guide for displaying program information as a content, and the other plates at the rear thereof are program guides not for displaying program information, but are for displaying date tubs (inclusively denoted by the reference numeral "702".) as an index. The plate at the forefront is constructed by program information of the date arbitrarily selected, and the program information of that date is displayed. For example, a date corresponding to predetermined data, such as a current date, etc. may be selected, a date decided in advance (the oldest date out of the program guide data, for example) may be selected, a date selected or set by the user may be selected, and so forth. On the other hand, at a predetermined position of one end of each of the other plates of the program guide 700 (left end in this embodiment), a date tub 702 is provided, and the date tub 702 allows an unselected date to be shown.

In order to display the plurality of program information in tabular form, the plate at the forefront is constructed by combining the respective program information of the selected date according to a predetermined alignment. More specifically, in this embodiment, the program guide is formed in which a plurality of program information are displayed in a matrix manner by taking one axis as a time axis and the other axis as a broadcast station axis. Each program information is formed of a rectangular parallelepiped, and a plurality of rectangular parallelepipeds are combined to thereby form a plate at the forefront. Here, the rectangular parallelepiped is an object formed by polygons.

Figure 10:
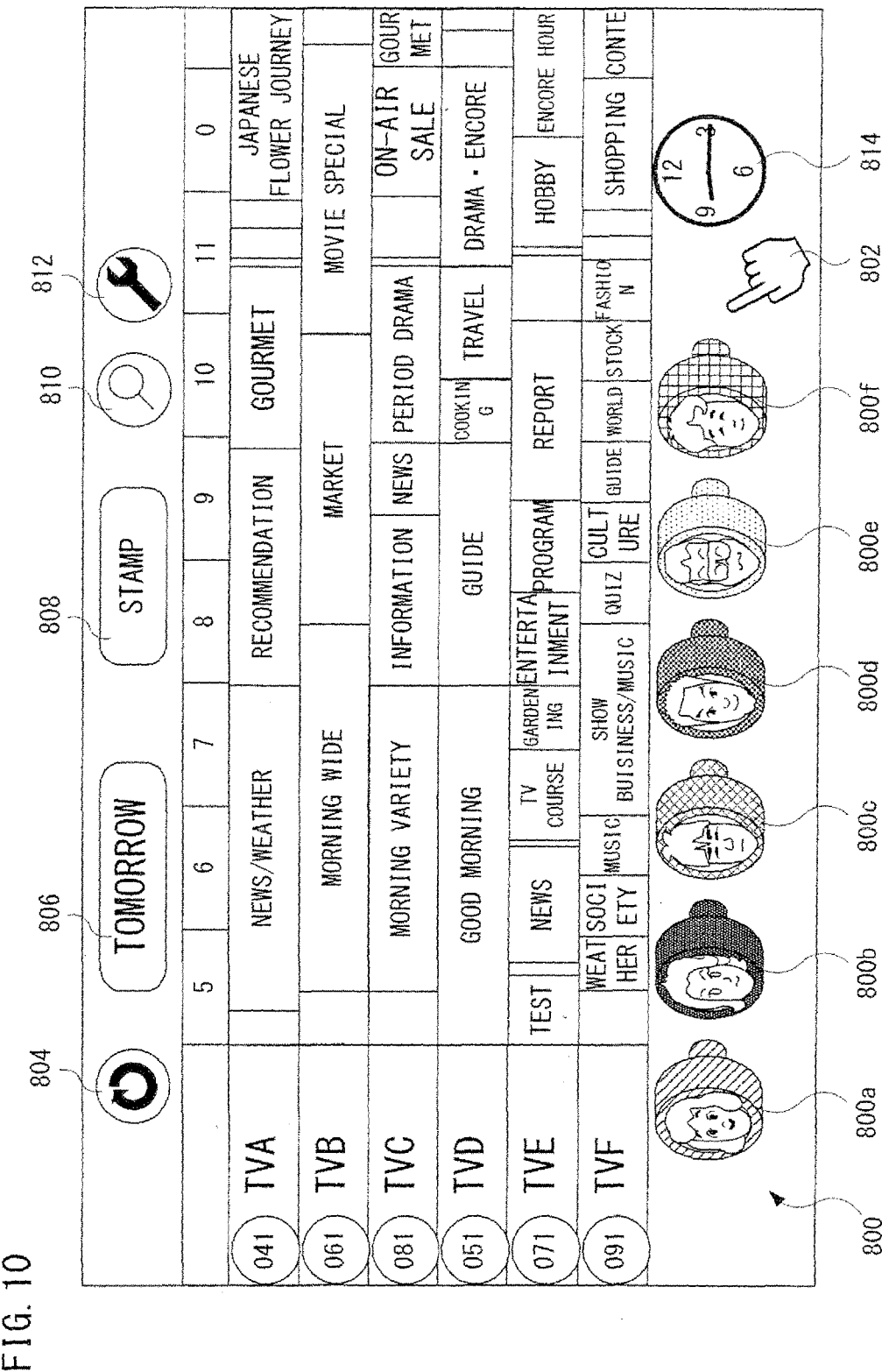
FIG. 10 is an illustrative view showing one example of a screen of a two-dimensional program guide.

In the program guide, the vertical axis is set to the broadcast station axis and the horizontal axis is set to the time axis (see FIG. 10). In the vertical direction, a plurality of broadcast stations are arranged, and in the horizontal direction, a plurality of program information of each broadcast station are arranged in an order of a broadcast starting time. The width of the field indicating each program information, that is, the horizontal length of the rectangular parallelepiped is set depending on the length of the broadcasting hours of that program. Moreover, the vertical length of each rectangular parallelepiped is set to a predetermined value. Furthermore, the height of the rectangular parallelepiped (thickness in the depth direction) is set to a predetermined value different depending on a depicting method of the program information as described later. As an overall size of the plate, the vertical length of the plate of the program guide 700 is decided depending on the number of broadcast stations to be displayed along the vertical axis, and the horizontal length thereof is decided to be a predetermined length corresponding to 24 hours in advance. The horizontal and vertical lengths of the other plates are set similar to the overall size of the plate at the forefront, and the thickness is set to a predetermined value.

Furthermore, as shown in FIG. 9, in order to display the program guide 700 by a plurality of viewpoints, a plurality of camera locations are decided in advance. According to switching of the camera locations in response to an operation by the user, the display of the program guide is switched between the two-dimensional display manner and the three-dimensional display manner. The camera location means a parameter for indicating to which direction the virtual camera views, and includes coordinates of a viewpoint location, coordinates of a gazing location (or viewing direction), for example.

The first location located at the front of the program guide 700 is a camera location for displaying the program guide 700 in the two-dimensional display manner. The two-dimensional display manner is for representing an object or image by a two-dimensional display. Accordingly, the first location is appropriately set such that the plate at the forefront out of the plates of the program guide 700 is captured from front to display the same as a two-dimensional plane on the screen, that is, as a two-dimensional table as shown in FIG. 10, for example. Here, the direction connecting the viewpoint of the first location and the gazing point, that is, the viewing direction is set to a direction orthogonal to the front of the plate. Furthermore, the first location is mainly provided in order to clearly show letters indicating the program information to the user, and therefore, the distance between the viewpoint of the first location and the plate at the forefront is set so as to become relatively short. However, since it is difficult to display all the program information by one day at a time such that the characters indicating the program information are clearly shown, the viewpoint and the gazing point are set to predetermined positions such that the display range includes a time slot corresponding to a predetermined time or the current time. Furthermore, the first location is changeable according to an operation by the user, and more specifically, the viewpoint and the gazing point are translated with respect to the front of the plates, and according to a scrolling operation such that the display range is changed. By the scrolling operation, time slots or the program information of the broadcast stations that exist at first outside the display range can be displayed on the screen.

Figure 16:
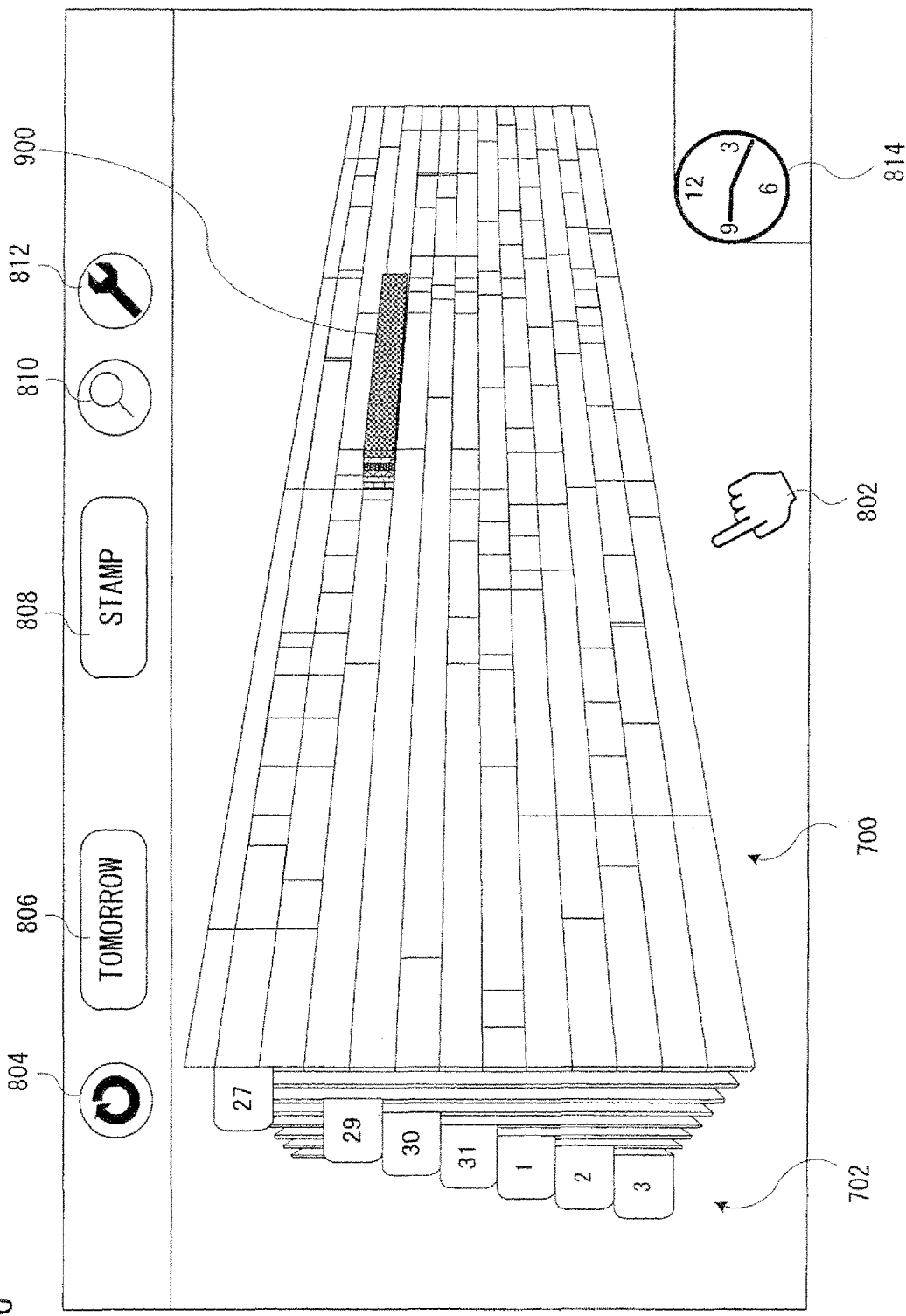
FIG. 16 is an illustrative view showing one example of the screen of the program guide displayed in a size-reduced display method.

Furthermore, a second location and a third location placed in an oblique direction of the program guide 700 is camera locations for representing the program guide 700 in the three-dimensional display manner. The three-dimensional display manner is for representing an object in a three-dimensional display. The second location is appropriately set such that the program guide 700 is captured as a whole and displayed in the three-dimensional display. In this embodiment, the viewpoint and the gazing point (or viewing direction) are decided in advance as a second location such that the program guide 700 can be captured from a relatively far place in an obliquely left direction. By capturing the program guide from the oblique direction, it is possible to generate a three-dimensional image in which the plates of the program guide 700 are represented in a three-dimensional manner. This second location is fixed. If the program guide is depicted by the second location, the program guide 700 is displayed in the three-dimensional manner as a whole as shown in FIG. 16, for example.

Figure 17:
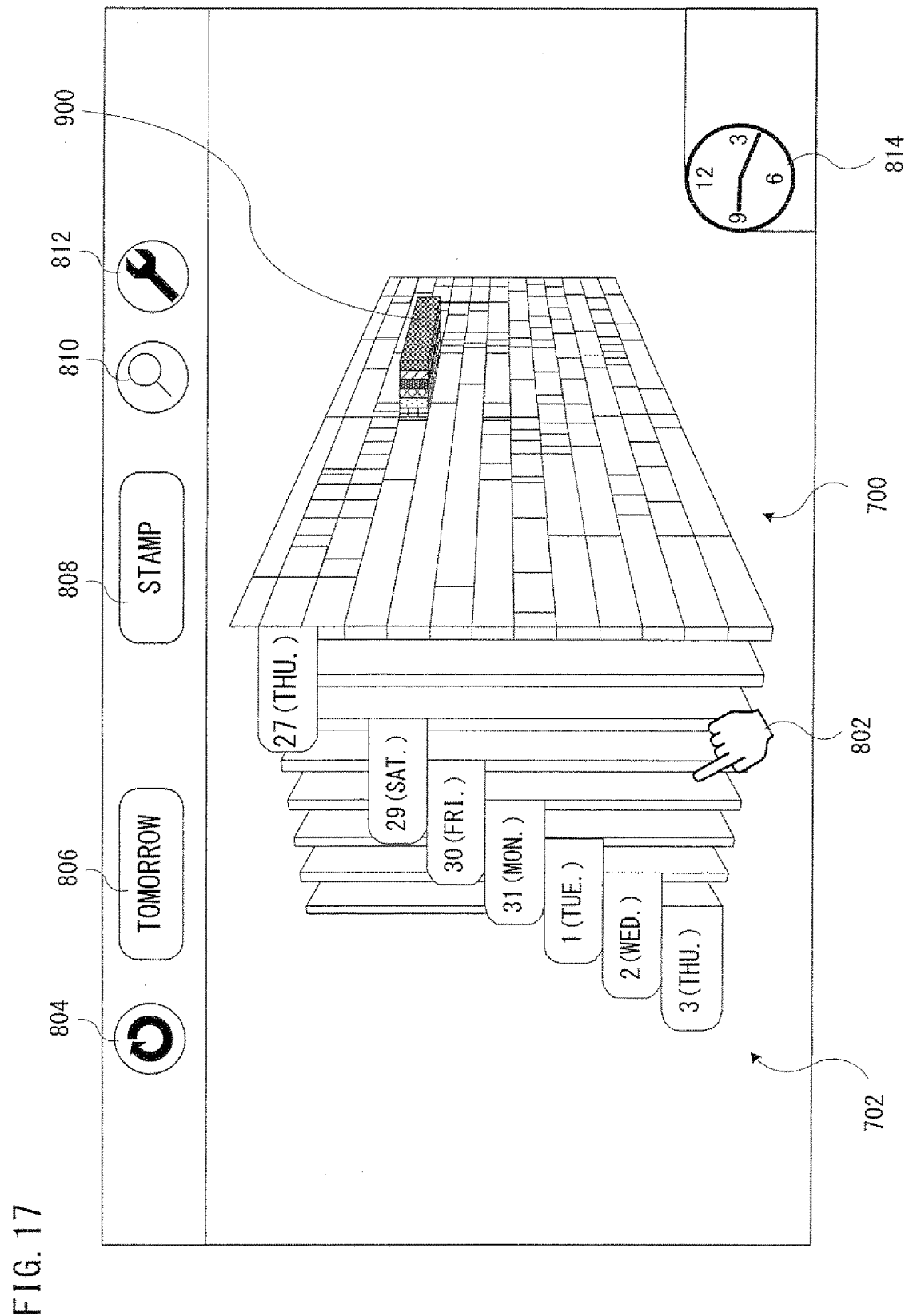
FIG. 17 is an illustrative view showing another example of a screen displayed in the size-reduced display method.

Furthermore, the third location is appropriately set so as to zoom in the date tubs 702 to thereby note the date tubs 702. The third location is provided for switching the dates of the program guide according to a selection of the date tub 702. In this embodiment, the viewpoint and the gazing point (or viewing direction) are decided in advance as a third location such that the program guide 700 can be captured from a relatively near place in an obliquely left direction. This third location is also fixed. If the program guide is depicted by the third location, the program guide 700 is entirely displayed in the three-dimensional manner with the date tubs 702 zoomed in as shown in FIG. 17.

In this embodiment, the program guide is displayed by three display methods. Here, the three display methods are called a first size-enlarged display method, a second size-enlarged display method, and a size-reduced display method.

Figure 11:
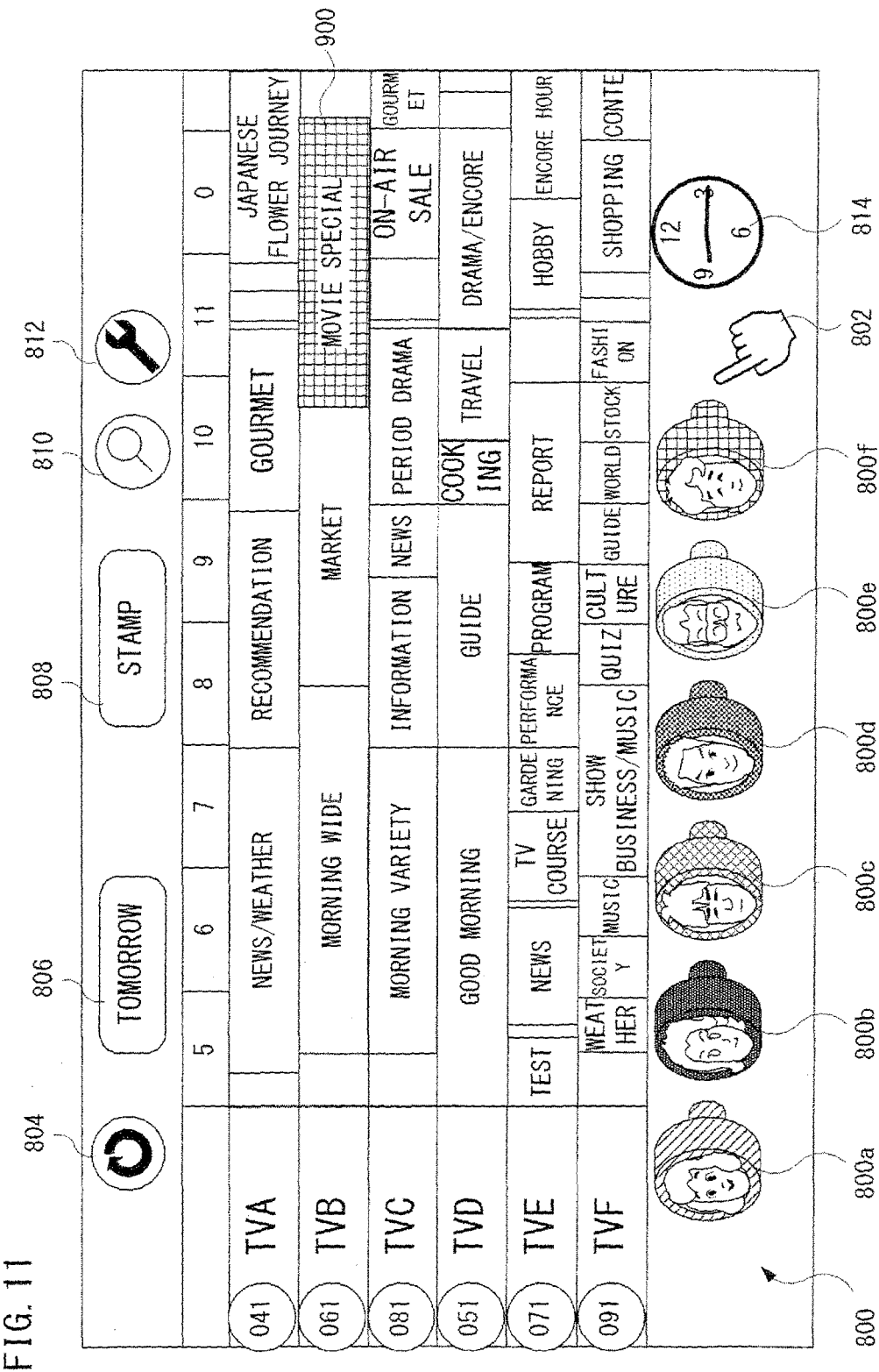
FIG. 11 is an illustrative view showing one example of a screen of the program guide including program information depicted in a first depicting method.

The first size-enlarged display method is for depicting the program guide 700 from the front to display the program guide in the two-dimensional manner, and also displaying the program information in which accounts are registered in the two-dimensional and planar manner. In the first size-enlarged display method, the virtual camera is set to the first location, and the program information is depicted by a first depicting method according to a registered program depicting program described later. In the first depicting method, the program information in which accounts are registered is depicted in a display manner of the account with the highest priority. In the first size-enlarged display method, a screen shown in FIG. 11 is displayed.

Figure 13:
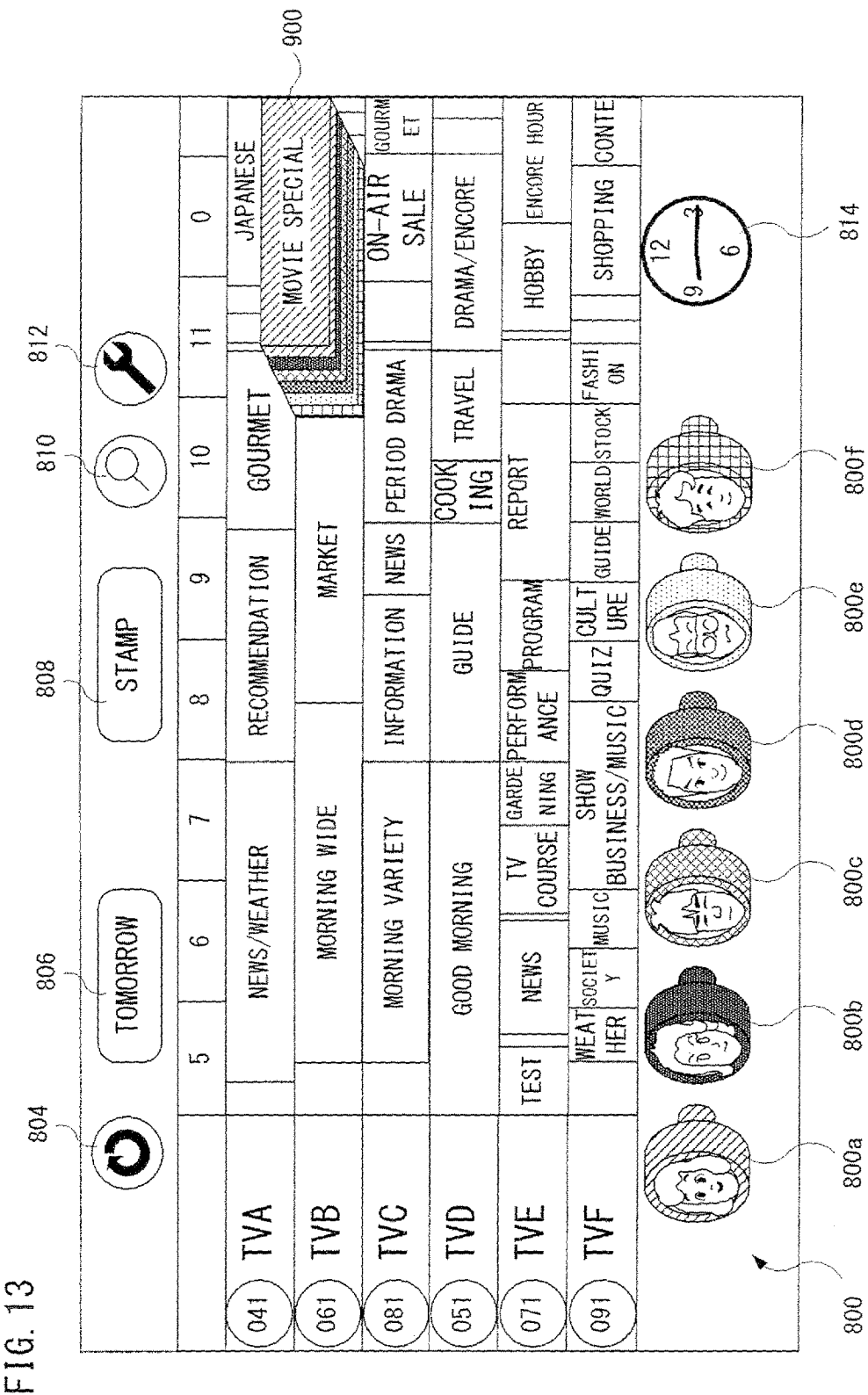
FIG. 13 is an illustrative view showing one example of a screen of the program guide including program information depicted in the second depicting method.

The second size-enlarged display method is for depicting the program guide 700 from the front to thereby display the program guide in the two-dimensional manner, and displaying the program information that accounts are registered in the three-dimensional manner. In the second size-enlarged display method, the virtual camera is set to the first location, and the program information is depicted by the second depicting method according to the registered program depicting program described later. In the second depicting method, the program information that accounts are registered is depicted such that the display manners set in the accounts are layered in order of the priority. In the second size-enlarged display method, a screen shown in FIG. 13 is displayed.

The size-reduced display method is for depicting the program guide 700 from an oblique direction to thereby display the entire in the three-dimensional manner, and displaying the program information in which accounts are registered in the three-dimensional manner. In the size-reduced display method, the virtual camera is set to the second location (or third location), and the program information in which accounts are registered is depicted by the second depicting method according to the registered program depicting program described later. In the size-reduced display method, a screen shown in FIG. 16 or FIG. 17 is displayed.

The display method is managed by display flags 1, 2 and 3 described later, and switched according to a predetermined operation by the user. For example, the first size-enlarged display method is selected by default. In a case that the first size-enlarged display method is selected, when an operation of continuously pushing the B trigger switch 26*i* is performed, the display method is switched to the second size-enlarged display method. On the other hand, in a case that the second size-enlarged display method is selected, when the B trigger switch 26*i* is released, the display method is switched to the first size-enlarged display method.

Furthermore, in the first size-enlarged display method, the + button 26*g* and the − button 26*e* allow the program information to be size-enlarged or reduced step by step. The final stage of the size reduction is the size-reduced display method by the virtual camera at the second location shown in FIG. 16. Accordingly, in a case that the first size-enlarged display method is selected, the − button 26*e* is pushed to bring about the final stage of the size-reduction, and the display method is switched to the size-reduced display method. In addition, in a case that the first size-enlarged display method is selected, also when the button 806 (FIG. 10) is selected, the display method is switched to the size-reduced display method. On the other hand, in a case that the size-reduced display method is selected, when the + button 26*g* is pushed to cancel the final stage of the size-reduction, the display method is switched to the first size-enlarged display method.

In the first size-enlarged display method, in order to clearly display a program name, etc. of each program information, the virtual camera is set to a relatively close first location, but broadcast stations and times are restricted within the display range. Thus, scrolling the program information within the display range is made possible by performing a predetermined scrolling operation. In this embodiment, a predetermined operation for switching between the first size-enlarged display method and the second size-enlarged display method is made equal to the scrolling operation. In the first size-enlarged display method, since the respective program information are depicted in the two-dimensional manner, a program name, etc. of each program information is clearly shown, but in the second size-enlarged display method, each program information is depicted in the three-dimensional manner, and therefore, a program name of other program information, etc. may be hidden. However, if the program guide is displayed in the second size-enlarged display method when the scrolling operation is performed, the display range is moved to thereby display program names of the other program information which would be hidden under the program information depicted in the three-dimensional manner. Thus, by making a switching operation to the second size-enlarged display method equal to the scrolling operation, it is possible to clearly display the registration condition of a plurality of accounts with respect to the program information, and also display program names, etc. of the other program information.

A memory area 404 stores a priority setting program. This program is for setting priority (precedence) of each of the plurality of user information. Each user of this program guide application first registers an account (user information). Priority is set to each of the registered accounts. For example, priority is applied to each account in order of registration, that is, a higher priority is applied to the account which is registered fast. The priorities of respective accounts set by the registration are stored as initial values in a priority table.

Furthermore, the priority may be changeable. In this embodiment, the priority of each account is changed according to an operation by the user. More specifically, for example, as shown in FIG. 10, a stamp (inclusively denoted by a reference numeral "800") is displayed as one example of an icon corresponding to each account on the screen. FIG. 10 shows a case that six accounts are registered, and displays six stamps 800a, 800b, 800c, 800d, 800e and 800f. When any one of the stamps 800 is designated by a pointer 802 indicating a designating position by the controller 22, the priorities of the respective accounts are changed such that the priority of the account corresponding to the stamp 800 is placed in the top.

A memory area 406 stores a program registering program. This registering program is for registering arbitrary user information in arbitrary program information. Each user can register an account with respect to the program information that he or she is interested in, such as the program that he or she wants to watch. For example, by performing a pushing operation of the stamp 800, an account is registered in the program information. More specifically, by selecting the stamp 800 with the pointer 802, and then selecting desired program information, it is possible to register the account corresponding to the selected stamp 800 in the program information. Alternatively, by selecting desired program information with the pointer 802 to open a detailed screen representing the detailed information of the program information on the program guide, and performing an operation of affixing the stamp 800 at the predetermined area in the detailed screen, it is possible to register the account corresponding to this stamp 800 in this program information. When the account is registered in the program information, program registration data is generated.

A memory area 408 stores a registered program depicting program. This program is for depicting each program information on the basis of the priority of the user information registered in the program information. More specifically, different display manners are respectively set to a plurality of accounts. Then, each program information is depicted in a display manner decided on the basis of the priority of the registered account. Here, the display manner set to each account is naturally different from a normal display manner of the program information in which an account is not registered.

In this embodiment, in relation to the depicting the program information, two depicting methods are adopted. The first depicting method and the second depicting method are selectable by the user, that is, a depicting method of the program information is switched in response to an operation by the user. More specifically, if the first size-enlarged display method is selected, the first depicting method is adopted, and if the second size-enlarged display method or the size-reduced display method is selected, the second depicting method is adopted.

In the first depicting method, the program information that an account is registered is depicted in the two-dimensional manner on the basis of the priority. More specifically, the program information that the account is registered is made equal to the other program information in height, and is depicted in the display manner set to the account with the highest priority out of the registered accounts (see FIG. 11). In this embodiment, a color is employed as a display manner. That is, each program information is depicted in a color set to the account with the highest priority.

In the second depicting method, the program information in which accounts are registered is depicted in the three-dimensional manner on the basis of the priorities. More specifically, the program information is depicted such that the display manners set to the accounts are layered in order of the priority of the registered accounts (see FIG. 13). In this embodiment, a color is adopted as a display manner, so that each program information is depicted such that colors set to the respective accounts are layered in order of the priority.

Here, the difference in colors set to the respective accounts may be differences, such as light and dark of the color, a color tone, etc. Alternatively in another embodiment, different patterns (textures) may be set for each account as a display manner. Or, as a display manner limited to the first depicting method, a different font may be set for each account, and in such a case, fonts of the character, such as a program name, etc. to be displayed in the program information differ from account to account. Alternatively, as other display manners, a different mark, etc. may be set for each account.

A memory area 502 of the data memory area 500 stores program guide data. The program guide data is data generated on the basis of EPG (Electronic Program Guide) data fetched from a distribution server or the like on a network. Additionally, the EPG data includes program information of a predetermined days, and is fetched at a predetermined timing (starting up the application, for example) or periodically (for each 24 hours, for example) from the distribution server, etc. so as to be stored in the flash memory 44. The program guide data stores program information for each broadcast station, that is, stores a plurality of program information by being brought into correspondence to the broadcast station ID (identification information of the broadcast station). In addition, information in relation to the program is stored for each program information, that is, a date, a start time, an end time, broadcasting hours, a program name, a genre, detailed information, etc. are stored by being brought into correspondence to the program ID (identification information of a program). The detailed information includes information on an outline and a performer of the program, etc. Here, a main purpose of the program guide is to confirm program information to be broadcasted, and therefore, the data on the date which has already been passed away may be deleted or may not be used.

A memory area 504 is an input data buffer, and stores input data received from the controller 22 every predetermined time. The input data includes operation data by the input means 26, acceleration data detected by the acceleration sensor 74, marker coordinate data (designated positional data) detected by the imaged information arithmetic section 80, etc.

A memory area 506 stores program registration data. The program registration data is generated by the above-described program registering program. An account as user information registered in the program information is stored by being brought into correspondence to the program ID. In this embodiment, registration of the user information with respect to the program information is performed by utilizing the stamp 800, so that by specifying the stamp 800 used for the registration, and on the basis of account data described later, an account being brought into correspondence to the stamp 800 is specified.

A memory area 508 stores account data. The information in relation to the account registered as a user of this program guide application is stored. In the program guide application, a predetermined number of accounts can be registered (six, for example). A stamp ID of the stamp 800 corresponding to the account, information in relation to the display manner set to the account, etc. are stored by brought them into correspondence to this account. The stamp 800 to be utilized by each account is set when a registration of an account is performed. Since each stamp 800 is assigned with a stamp ID, the stamp ID is stored. The display manner is used as a display manner of the program information, and therefore, a display manners different from account to account is basically set, but setting a display manner to that the same as another account may be acceptable. Furthermore, if the display manner is a color, a design, etc., the display manner set to the account may be the same as the display manner of the stamp 800.

A memory area 510 stores a priority table. The priority table is data indicating priorities of the respective user information, and generated by the above-described priority setting program. More specifically, the priority for each registered account is stored. The priority is different from account to account, and two or more accounts are never set to the same priority.

A memory area 512 stores display flags 1, 2 and 3 for setting display methods. The display flag 1 corresponds to the first size-enlarged display method, the display flag 2 corresponds to the second size-enlarged display method, and the display flag 3 corresponds to the size-reduced display method. As described above, the respective display methods are classified by a depicting method of the program information and the virtual camera. Only any one of the display flag out of the three display flags is turned on to thereby designate a display method.

A memory area 514 stores program guide controlling data. The program guide controlling data is data for controlling the display of the program guide. For example, with respect to each of the program information of the date forming the plate at the forefront of the program guide 700, information in relation to the number of rectangular parallelepipeds, a size, a position, a display manner (color, design, or the like) and characters to be displayed, etc. are displayed. Data of each rectangular parallelepiped is brought into correspondence to that program ID. Furthermore, with respect to the other dates, information in relation to the position and size of the plate, and information in relation to a size, a position and a character to be displayed of the date tub 702 are also stored.

This program guide application is started up by selecting a button or an icon, etc. indicating the application from the menu screen of the game apparatus 12, for example. When it is started up, program information on the date and in the time slot corresponding to the current date and the time fetched from the ROM/RTC 48, for example, is displayed.

FIG. 10 shows one example of a screen of the program guide. The program guide placed at the center of the screen is depicted by the virtual camera at the first location (see FIG. 9). Accordingly, the plurality of program information forming the plate at the forefront of the program guide 700 is displayed in two-dimensional tabular form. The vertical axis of the program guide is a broadcast station axis, and the horizontal axis is a time axis, and at the left of the program guide, broadcast station fields for indicating broadcast stations and channels are displayed, and at the top thereof, time fields are displayed. In each program information field, a character for indicating a program name, etc. is displayed. Each program information is formed by a rectangular parallelepiped as described above, and the character is pasted on the front surface (main surface or top surface on the side of the virtual camera) of the rectangular parallelepiped.

Additionally, the broadcast station fields are arranged at predetermined positions of the left end of the screen, and next to the broadcast station fields, the program guide depicted by the virtual camera in the first location is displayed. That is, the screen of the program guide is generated by composing the program guide 700 depicted by the virtual camera and other images.

Furthermore, a pointer 802 for indicating a designated position by the controller 22 is displayed as a pointing device on the screen. The display position of the pointer 802 is moved in accordance with the designated position by the controller 22.

In addition, various buttons 804, 806, 808, 810 and 812 are provided at the top of the screen. For example, when the A button 26*d* is pushed in a state that the pointer 708 is placed on the display position of each of the buttons 804-812, each of the buttons can be selected. Additionally, other buttons, items, stamps 800, program information, etc. can also be selected by a similar operation.

The button 804 is a button for returning to the menu screen of the game apparatus 12. When the button 804 is selected, the program guide application is ended to thereby display the menu screen of the game apparatus 12.

The button 806 is a button for changing the date of the program guide to be displayed. The data of the program guide which is currently being displayed is displayed on this button 806. In FIG. 10, "tomorrow" is displayed, which shows that the date has been changed to tomorrow. When the button 806 is selected, the display method is switched to the size-reduced display method to display a screen representing the entire of the program guide 700 shown in FIG. 16, and when the date tub 702 is selected, the change of the date can be performed.

The button 808 is a button for selecting a display state or a mode of the program guide. In FIG. 10, "stamp" is displayed on the button 808, which shows a mode of displaying a condition of the registration of the account by utilizing the stamp 800 with respect to the program information.

The button 810 is a button for searching the program information. When the button 810 is selected, a search screen is displayed, which allows the user to search the program information by designating a search condition, such as a keyword, a genre, etc.

Furthermore, the button 812 is a button for performing various settings. When the button 812 is selected, a setting screen is displayed, which allows for various settings. The registration of the account of the user in the program guide application can be performed by setting with the button 812. Each user can select the stamp 800 to be used and a display manner from a list, for example, and thus the account data is generated and stored in the memory area 508. Initial priorities of the respective accounts are set such that the order is made higher in the sequence that the registration of the accounts is made, and by this setting, the priority table is generated and stored in the memory area 510.

In addition, at the bottom of the screen, the stamp 800 of each account is displayed. FIG. 10 shows a case that six accounts are registered, in which the six stamps 800*a*-800*f* are registered. Each stamp 800 is depicted in a display manner (color, in this embodiment) set to the corresponding account. Additionally, the respective stamps 800 are arranged in an order of initial priority from the left side of the screen. In addition, a clock 814 for indicating a current time is displayed at the bottom-right corner.

In the program guide, by affixing the stamp 800 on the program information that the user is interested in, the user can register the account in the program information. More specifically, when performing an affixing operation of the stamp 800, the user first designates his or her own stamp 800 with the pointer 802 and pushes a predetermined button (A button 26*d*, for example) to thereby select the stamp 800. When the stamp 800 is selected, the stamp image indicating that it is being selected is displayed at the position instructed by the controller 22 in place of the pointer 802, for example. Then, the user, by moving the stamp indicating a state that it is being selected and designates the desired program information, and by pushing the predetermined button (A button 26*d*, for example) can affix this stamp 800 on this program information. That is, it is possible to register the account corresponding to this stamp 800 on this program information. When such a program registering operation is performed, the account corresponding to the selected stamp 800 is specified, and this account is stored by being brought into correspondence to the program ID of this program information in the program registration data memory area 506.

Here, an account registration with respect to the program information can be performed on a detailed screen for displaying detailed information of this program information. The detailed screen is displayed in response to this program information being selected with the pointer 802. By affixing the stamp 800 in a predetermined area of the detailed screen, it is possible to register the account with respect to this program information.

When an account is registered with respect to the program information, the display manner of the rectangular parallelepiped indicating this program information is changed to the display manner set to this account, and this program information is displayed in the display manner set to the account which has made the registration on the screen.

FIG. 11 shows one example of the screen of the program guide when an account is registered in the program information. In FIG. 11, a registration is made with respect to the program information ("movie special") indicated by a reference numeral "900" with utilizing the stamp 800*f* at the right end, so that this program information 900 is depicted in the display manner set to the account corresponding to the stamp 800*f* at the right end.

Thereafter, in a case that registering operations by utilizing the second stamp 800*e* from the right to the stamp 800*a* at the left end are sequentially made on the same program information 900, every time that each stamp 800 is pushed, this program information 900 is depicted in the display manner set to the account corresponding to this stamp 800. Accordingly, when the stamp 800*a* at the left end is finally pushed, the program information 900 having the display manner set to the account corresponding to the stamp 800*a* at the left end is displayed on the screen.

The depicting of the program information in this embodiment is performed on the basis of priority of the account. The program guide in FIG. 11 is displayed in the first size-enlarged display method, and the program information is depicted by the first depicting method. That is, out of the accounts registered in the program information, this program information is depicted in the display manner set to the account with the highest priority. The reason why in response to the program registration with the stamp being made, the display manner of the program information is changed to the display manner of the account corresponding to this stamp 800 is that the change of the priority is made at a time of the program registration by this stamp 800.

More specifically, in this embodiment, when it is determined that the stamp 800 is designated with the pointer 802, the priorities are changed such that the priority of the account corresponding to this designated stamp 800 is made be the highest. Furthermore, the priorities of the other accounts are moved down as necessary. As described above, when the stamp 800 is selected, the A button 26*d* is required to be pushed in a state that the stamp 800 is designated with the pointer 802. Accordingly, when an affixing operation of the stamp 800 is performed, it is determined that the stamp 800 is designated, so that the change of the priorities is performed. Thus, the change of the priority is made such that the priority of the account corresponding to the selected stamp 800 becomes the highest, and therefore, when an account is registered in the program information, this program information is depicted in the display manner set to this account.

As described above, the program guide shown in FIG. 11 is displayed in the first size-enlarged display method, and the program information is depicted in the first depicting method. In this first depicting method, the program information in which accounts are registered is depicted in the display manner set to the account with the highest priority. The display method of the program guide can be switched according to an operation by the user. When the B trigger switch 26*i* is pushed, the display method is switched to the second size-enlarged display method, and the program information is depicted in the second depicting method. In the second depicting method, the program information is depicted such that the display manners set to the respective accounts are layered in order of the priority of the accounts registered in the program information.

More specifically, each program information in which accounts are registered is formed by rectangular parallelepipeds of the number of registered accounts. If the number of registered accounts is equal to or more than two, two or more rectangular parallelepipeds are layered to thereby form a layered body of the rectangular parallelepipeds. Then, display manners of the respective rectangular parallelepipeds are set according to an order of the priorities of the registered accounts from the top (from the side of the virtual camera). That is, the rectangular parallelepipeds (objects) having the display manners set to the respective accounts are constructed to be layered in order of priority of the plurality of registered accounts.

Figure 12:
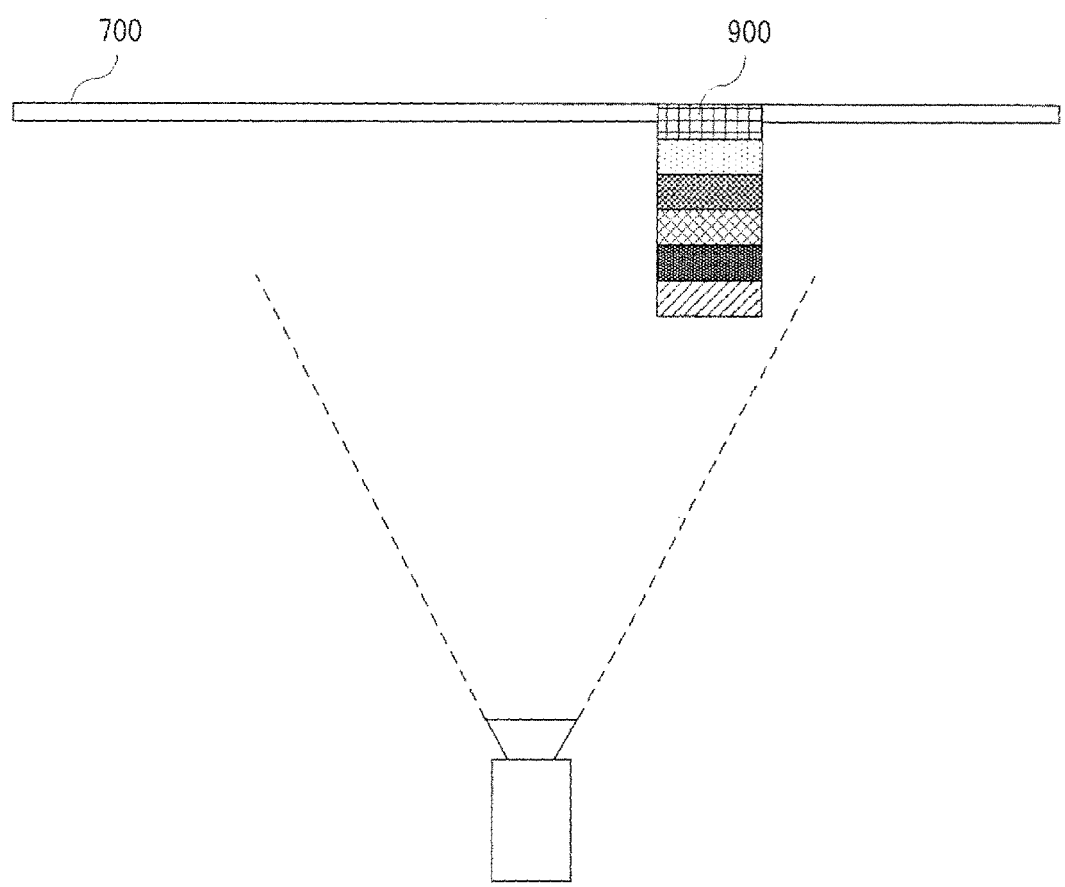
FIG. 12 is an illustrative view showing one example of a screen of the program information depicted in a second depicting method.

FIG. 12 shows one example of the program guide 700 and the virtual camera when the second size-enlarged display method is selected. Here, in FIG. 12, only the plate at the forefront of the program guide 700 is shown. Six accounts are registered with respect to the program information 900, and therefore, this program information 900 is formed by a layered body of six rectangular parallelepipeds. Additionally, the height of each rectangular parallelepiped is set to a predetermined value higher than the height of the rectangular parallelepiped of the program information in which an account is not registered (the height of the rectangular parallelepiped in a case of the first depicting method). The registration with respect to the program information 900 is performed with the stamps 800*f*, 800*e*, 800*d*, 800*c*, 800*b*, and 800*a* in this order, and therefore, the priority is according to the order of the accounts of the stamps 800*a*, 800*b*, 800*c*, 800*d*, 800*e*, and 800*f*. Then, the display manners are set to the respective six rectangular parallelepipeds according to an order of the priority from the top (the side of the virtual camera), that is, the display manners corresponding to the stamps 800*a*, 800*b*, 800*c*, 800*d*, 800*e*, and 800*f* are set from the top in this order.

The program guide 700 including the layered body in FIG. 12 is depicted by the virtual camera at the first location, so that a screen shown in FIG. 13 is displayed. As shown in FIG. 13, the program information 900 is depicted such that the display manners set to the accounts are layered in order of priority of the registered accounts. The display manner of the most conspicuous uppermost rectangular parallelepiped is the display manner of the account with the highest priority. Furthermore, on the top surface of the uppermost rectangular parallelepiped, a program name ("movie special") is displayed. Furthermore, the height of the rectangular parallelepiped is made higher than the height of the rectangular parallelepiped of the other program information, and therefore, it is possible to inform the display manner of the lowermost rectangular parallelepiped. Thus, it is possible to display the program information in a three-dimensional manner such that the display manners of the registered accounts are layered according to the priority, which allows the user to easily know which account is registered in the program information.

Furthermore, in this embodiment, as described above, when the stamp 800 is designated with the pointer 802, the priority of the account is changed to make the account corresponding to the designated stamp 800 the highest. Accordingly, when any stamp 800 is designated with the pointer 802 on the screen of the program guide displayed in the first size-enlarged display method, the program information in which the account corresponding to this stamp 800 is registered is depicted in the display manner set to this account.

Figure 14:
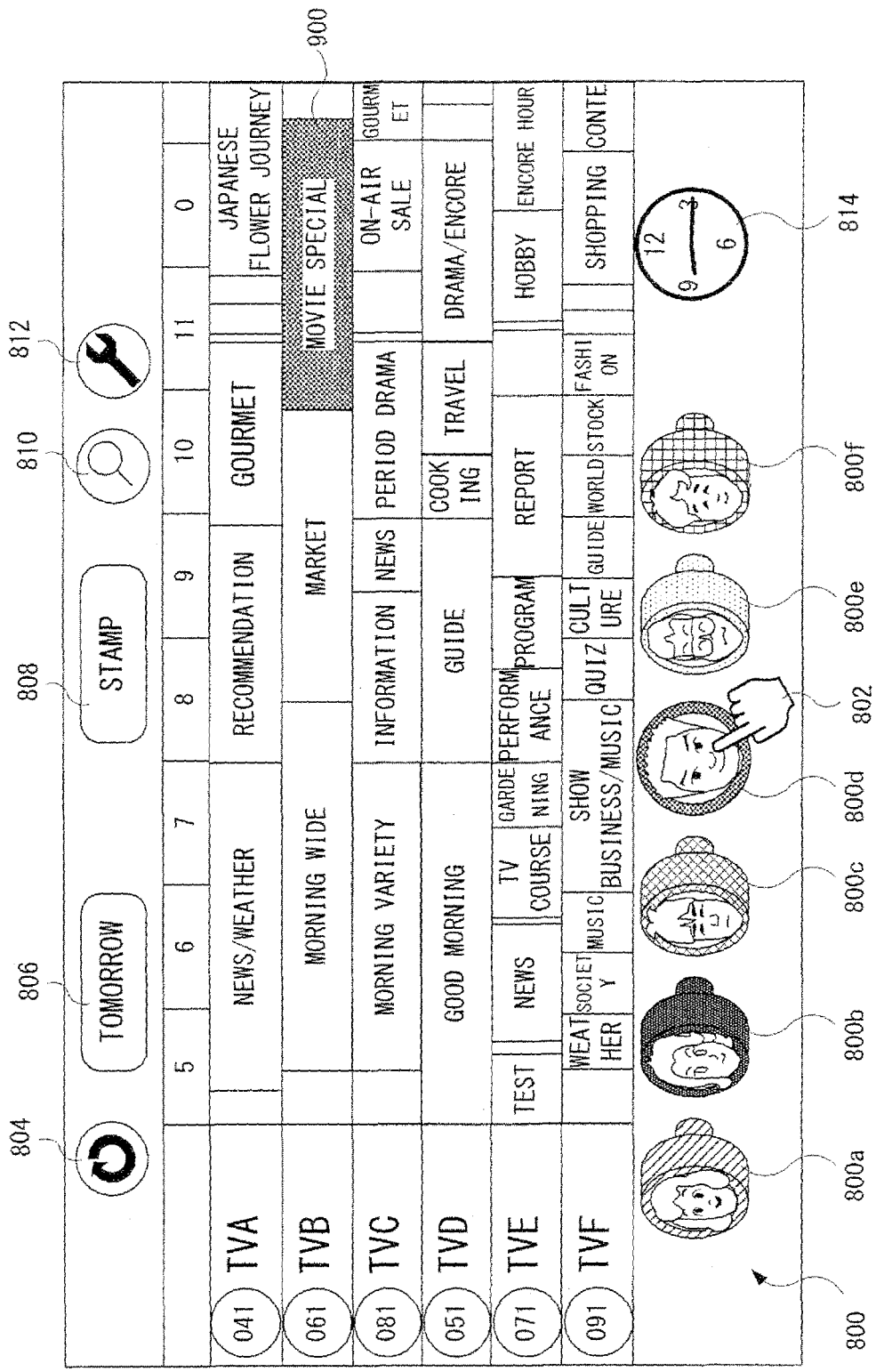
FIG. 14 is an illustrative view explaining a change of the priorities according to a designation by a stamp.

FIG. 14 shows one example of a screen when the stamp 800 is designated. In FIG. 14, the third stamp 800d from the right is designated by the pointer 802, and the program information 900 in which the account corresponding to this stamp 800d is registered is depicted in the display manner set to this account. Thus, by designating the stamp 800 with the pointer 802, the priority of the account corresponding to this stamp 800 is changed to the highest, and the display manner of the program information registered in this account is changed to the display manner of this account. Thus, it is possible for the user to easily confirm in which program information each account makes a registration with a simple designating operation of the stamp 800. That is, it is possible to easily know user's own registration condition and the other's registration condition.

Figure 15:
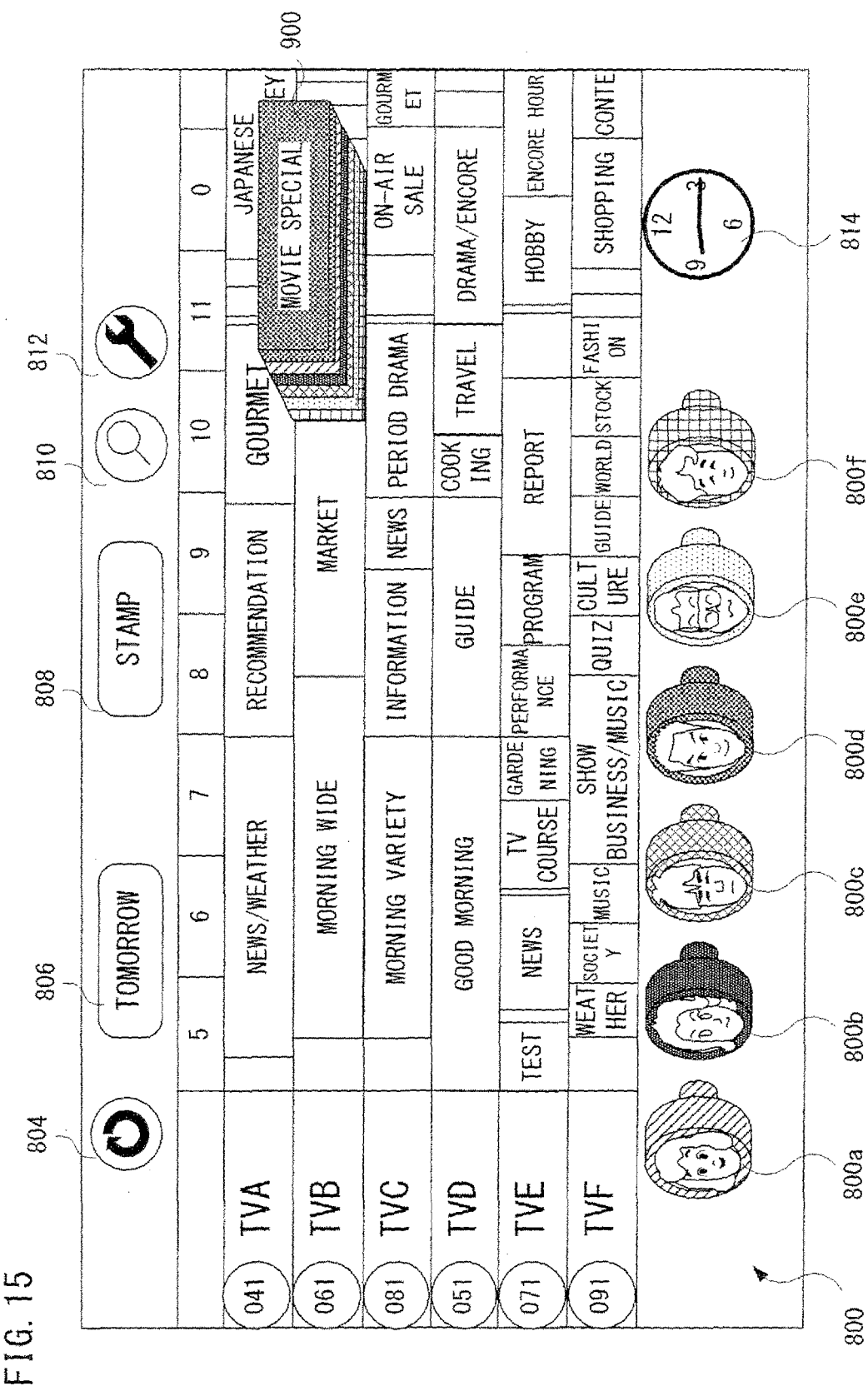
FIG. 15 is an illustrative view showing a screen of the program guide including the program information depicted in the second depicting method after the priorities are changed in FIG. 14.

Then, when the second depicting method is selected by pushing the B trigger switch 26i, for example, the screen of the program guide depicted in the second depicting method is displayed as shown in FIG. 15. On this screen, the program information depicted in a three-dimensional manner is displayed such that the display manner of the account corresponding to the designated stamp 800 is layered on the uppermost layer. Thus, it is possible to easily confirm the registration condition of the account corresponding to the designated stamp 800, and know the registration condition of the other account with respect to the program information in which the designated account is registered.

When the size-reduced display method is selected also, the program information is depicted in the second depicting method. For example, the + button 26g and the − button 26e can function as buttons for designating the program guide to be size-enlarged or reduced, and therefore, in a case that the first size-enlarged display method is selected, when the − button 26e is pushed to bring about the final stage of the size-reduction, the virtual camera is switched to the second location, and moreover the depicting method is switched to the second depicting method. Thus, the program information in which a plurality of accounts are registered is formed as a layered body of the rectangular parallelepipeds of the number of the registered accounts. When the program guide 700 is depicted by the virtual camera at the second location, in the program guide 700 entirely captured as shown in FIG. 16, for example, the program information 900 in which accounts are registered is displayed so as to be protruded frontward such that their display manners are layered in order of the priority of the registered accounts.

Furthermore, in this size-reduced display method, the virtual camera can further be switched from the second location to the third location. At the left edge of the program guide 700, the date tub 702 is displayed. When a predetermined display area including the date tub 702 is designated by the pointer 802, the virtual camera is switched from the second location to the third location to display a program guide 700 in which the date tubs 702 are zoomed in as shown in FIG. 17, for example. In this program guide 700 also, the program information in which accounts are registered is displayed so as to be protruded frontward such that the display manners are layered in order of priority of the registered accounts. Thus, in the screen displaying the program guide 700 as a whole in the three-dimensional manner, it is also possible to easily know the registration condition of each account with respect to the program information.

Here, on the screen of the program guide by the size-reduced display method in FIG. 16 and FIG. 17, a character of a program name, etc. is not displayed in each program information, but as in the first size-enlarged display method and the second size-enlarged display method, a character of a program name, etc. may be displayed.

Figure 18:
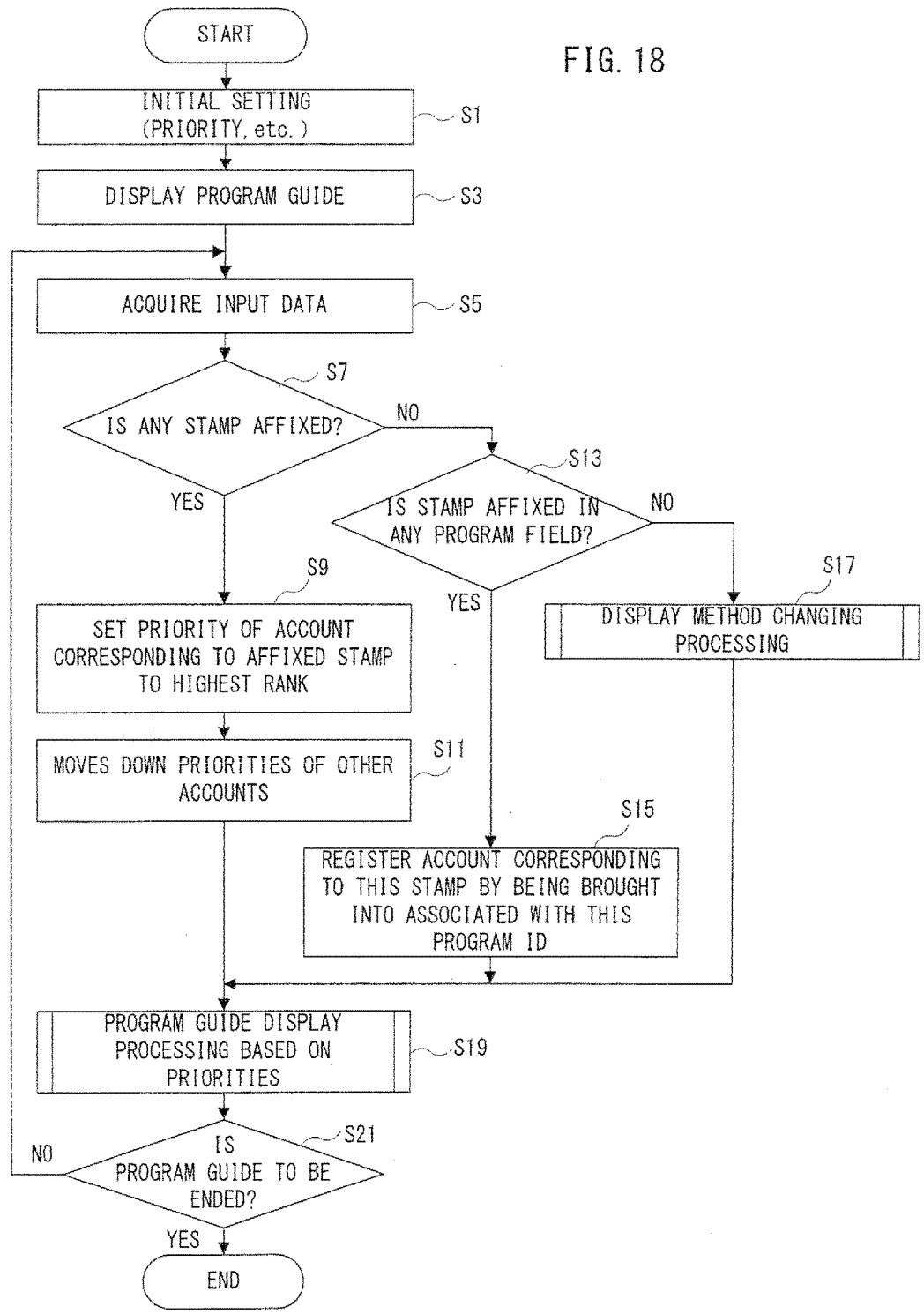
FIG. 18 is a flowchart showing one example of an operation of the game apparatus.

FIG. 18 shows one example of an operation of the game apparatus 12. First, in a step S1, the CPU 40 executes an initial setting. Initial values are set to various variables and flags, for example. Furthermore, in a case that the program registration data, the account data and the priority table generated in the past execution of the program guide application are stored in the flash memory 44, the program registration data, the account data and the priority table are read from the memory area 506, 508 and 510 of the data memory area 500, respectively.

It should be noted that, although omitted in the flowchart shown in FIG. 18, a registration of an account is performed at the first start-up of the program guide application. Setting of the stamp 800 and the display manner, etc. of each account to be used is performed, and the account data is generated in the memory area 506. Furthermore, the generated account data is stored, that is, saved in the predetermined area of the flash memory 44. In addition, according to the priority setting program, initial priorities of the respective accounts are set on the basis of an order of registration of the accounts, for example, and a priority table is generated in the memory area 510. Furthermore, the generated priority table is stored, that is, saved in the predetermined area of the flash memory 44.

Next, in a step S3, the CPU 40 displays a program guide. More specifically, the CPU 40 generates in the memory area 514 program guide controlling data for displaying a program guide 700 in the virtual three-dimensional space shown in FIG. 9 on the basis of the program guide data according to the program guide displaying program by utilizing the GPU 42b, etc, and generates a screen including the program guide depicted by the virtual camera to display the same on the monitor 34. The plate of the program guide 700 at the forefront is constructed by the program information on the current date fetched from the ROM/RTC 48 when the program guide application is started up. Furthermore, with respect to the initial values of the respective display flags, the display flag 1 is set to be turned on, and the other display flags are set to be turned off, which means that the first size-enlarged display method is selected. In addition, the display range of the program guide is set on the basis of the current time. By such displaying processing, a screen including the two-dimensional program guide shown in FIG. 10, for example, is displayed. At the bottom portion of the screen, the stamp 800 of the registered account is displayed in an order of the initial priority.

The user applies an input to the displayed program guide screen to register the account with respect to the program information that he or she is interested in, and displays a registration condition of the account with respect to each program information by switching the display methods. The CPU 40 executes processing in steps S5 to S21 below at fixed time intervals (one frame=1/60 seconds), for example.

In the step S5, the CPU 40 fetches the input data from the controller 22. The input data transmitted from the controller 22 at fixed cycles is received by the wireless controller module 52 so as to be stored in the input data buffer 504 provided in the external main memory 46 or the internal main memory 42*e*. The CPU 40 reads the input data from the memory area 504.

Then, in the step S7, the CPU 40 determines whether or not any stamp 800 is pointed out, that is, whether or not an operation of changing the priority is performed. More specifically, it is determined whether or not the display position of the pointer 802 is within the display position (display area or collision determining area) of any stamp 800 on the basis of the display position data of the pointer 802 and the display position data of the stamp 800. In a case that the display position of the pointer 802 is within the display position of the stamp 800, a stamp ID of the designated stamp 800 is specified. Here, the pointed-out position by the controller 22, that is, the display position of the pointer 802 is calculated from the marker coordinate data included in the input data. Furthermore, the display position data of the stamp 800 is decided in advance according to the priority, and stored in the data memory area 500.

If "YES" in the step S7, the CPU 40 sets the priority of the account corresponding to the pointed or designated stamp 800 to the highest rank in the step S9. More specifically, the account corresponding to the stamp ID of the designated or pointed stamp 800 is specified on the basis of the account data, and changes the priority of this account to the highest rank (that is, 1) in the priority table. Furthermore, in the step S11, the CPU 40 moves down the priorities of the other accounts. More specifically, the priorities of the respective accounts higher in rank than the designated account in the priority table are moved down by one. After completion of the step S11, the process proceeds to the step S19.

On the other hand, if "NO" in the step S7, the CPU 40 determines whether or not the stamp 800 is affixed in any program guide in the step S13, that is, whether or not a registration of an account is made with respect to the program information. For example, it is determined whether or not any program information is selected in a state that any stamp 800 is selected. More specifically, when it is determined that the A button 26*d* is pushed in a state that the stamp 800 is designated by the pointer 802 on the basis of the display position data of the stamp 800 and the input data, the stamp 800 is set to be a selected state. Then, when it is determined that the A button 26*d* is pushed in a state that any of the field of the program information is designated on the basis of the display position data of each program information and the input data, it is determined that this program information is selected. Alternatively, it may be determined that the stamp 800 is affixed on the detailed screen of the program information. Here, the detailed screen is displayed by selecting the program information with the pointer 802, and has an area where the stamp 800 is affixed.

If "YES" in the step S13, the CPU 40 registers the account corresponding to this stamp 800 by bringing it into association with this program ID in the step S15. More specifically, the stamp ID of the selected stamp 800 is specified on the basis of the input data and the display position data of the stamp 800, and the account corresponding to this stamp ID is specified on the basis of the account data. Furthermore, the program ID of the selected program information is specified on the basis of the input data and the display position data of the program information. Then, the account is stored by being brought into correspondence to the program ID in the program registration data memory area 506. If the data in relation to this program ID has already been stored in the program registration data memory area 506, the current account is added. Additionally, the generated program registration data is stored, that is, saved in a predetermined area of the flash memory 44. After completion of the step S15, the process proceeds to the step S19.

On the other hand, if "NO" in the step S13, the CPU 40 executes display method changing processing in the step S17. The display method changing processing is for switching the construction of the rectangular parallelepipeds forming the program information and the virtual camera in response to an operation by the user, and one example of an operation of this display method changing processing is shown in FIG. 19.

Figure 19:
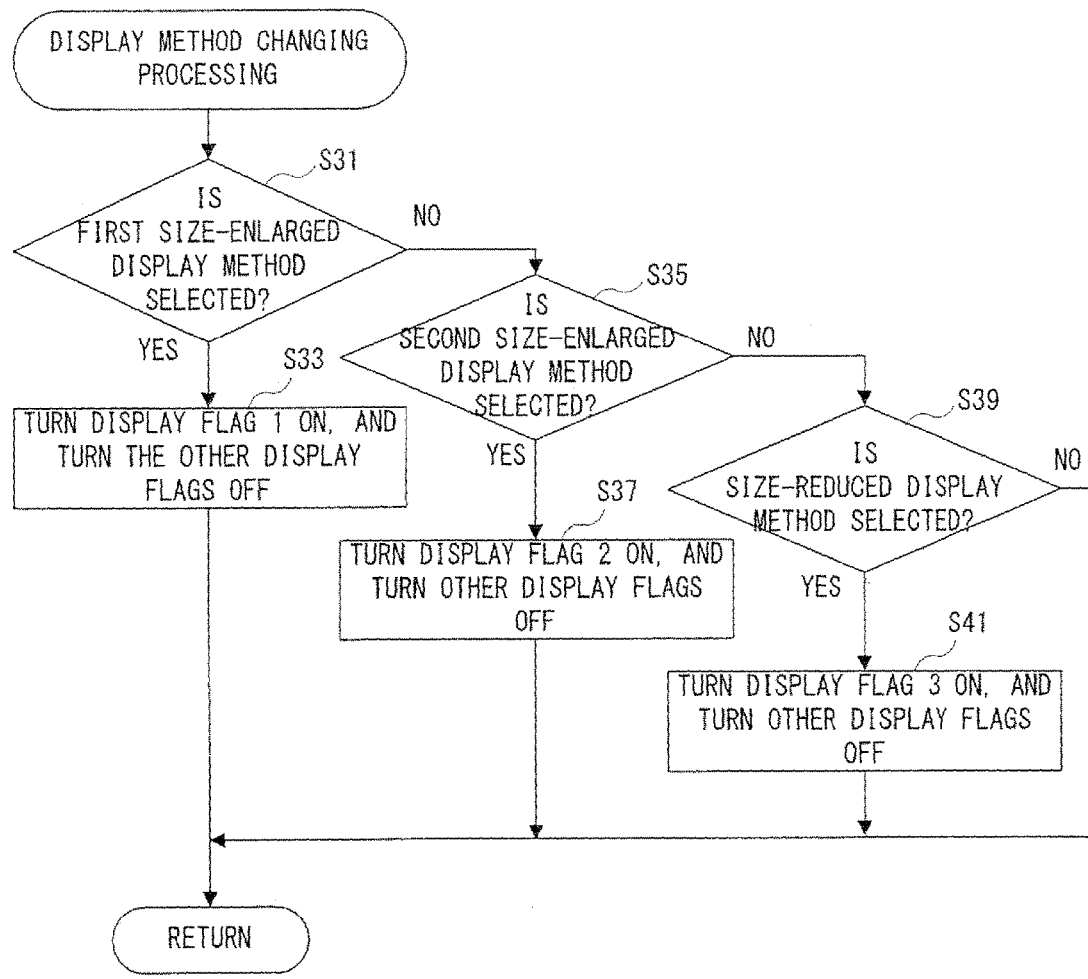
FIG. 19 is a flowchart showing one example of an operation of display method changing processing shown in FIG. 18.

In a step S31 in FIG. 19, the CPU 40 determines whether or not the first size-enlarged display method is selected. More specifically, it is determined whether or not an operation of instructing the first size-enlarged display method is performed on the basis of the input data. For example, it is determined whether or not the B trigger switch 26*i* is released. Or, it is determined whether or not the + button 26*g* is pushed in the final stage of the size-reduction (size-reduced display method).

If "YES" in the step S31, the CPU 40 turns on the display flag 1 stored in the memory area 512 in a step S33, and turns off the other display flags.

On the other hand, if "NO" in the step S31, the CPU 40 determines whether or not the second size-enlarged display method is selected in a step S35. More specifically, it is determined whether or not an operation of designating or instructing the second size-enlarged display method is performed on the basis of the input data. For example, it is determined whether or not the B trigger switch 26*i* is pushed.

If "YES" in the step S35, the CPU 40 turns on the display flag 2 stored in the memory area 512 in a step S37, and turns off the other display flags.

On the other hand, if "NO" in the step S35, the CPU 40 determines whether or not the size-reduced display method is selected in a step S39. More specifically, it is determined whether or not an operation of instructing the size-reduced display method is performed on the basis of the input data. For example, it is determined whether or not the − button 26*e* is pushed to enter the final stage of the size-reduced display. Or, it is determined whether or not the button 806 is selected.

If "YES" in the step S39, the CPU 40 turns on the display flag 3 stored in the memory area 512 in a step S41, and turns off the other display flags.

On the other hand, if "NO" in the step S39, that is, if it is determined that an operation of changing the display method is not performed, the display method changing processing is directly ended, and the process returns to the step S19 in FIG. 18.

Figure 20:
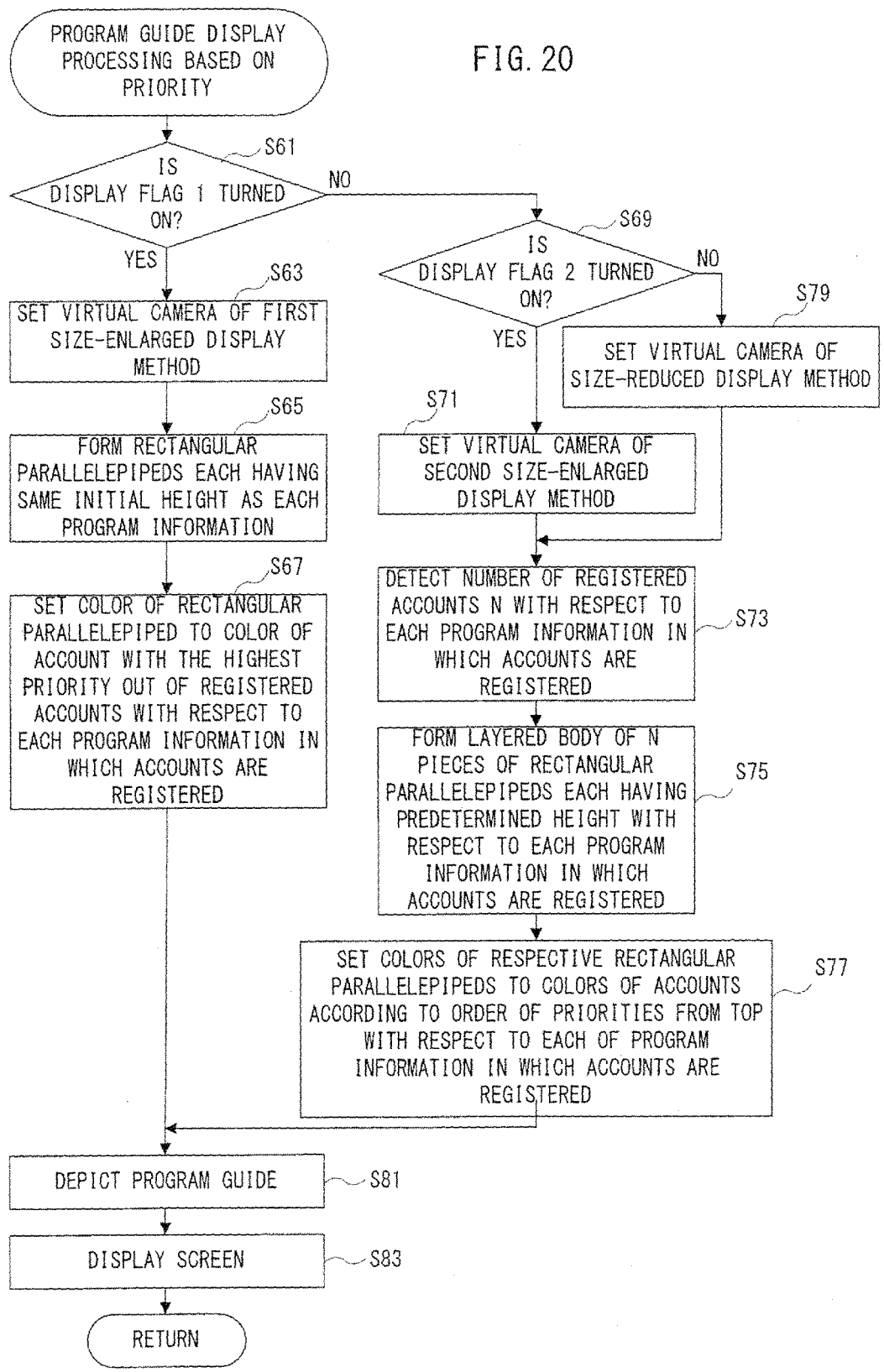
FIG. 20 is a flowchart showing one example of an operation of program guide displaying processing based on the priorities shown in FIG. 18.

In the step S19 in FIG. 18, the CPU 40 executes program guide displaying processing on the basis of the priority. One example of an operation of this processing is shown in FIG. 20. In a step S61 in FIG. 20, the CPU 40 determines whether or not the display flag 1 of the memory area 512 is turned on.

If "YES" in the step S61, that is, if the first size-enlarged display method is selected, the CPU 40 sets the virtual camera of the first size-enlarged display method in a step S63. The virtual camera is set to the first location. Here, the viewpoint and the gazing point are fixed to the coordinates when the first size-enlarged display method is selected, for example.

Then, the respective program information are depicted in the first depicting method. More specifically, in a step S65, the CPU 40 forms rectangular parallelepipeds each having the same initial height as program information. More specifically, in the program guide controlling data stored in the memory area 514, the height of the rectangular parallelepiped of each program information is set to the initial value. Here, in the first depicting method, each program information is formed by one rectangular parallelepiped. Furthermore, the horizontal length of the rectangular parallelepiped is set on the basis of the broadcasting hours of this program information, and the vertical length is set to a predetermined value.

In a succeeding step S67, the CPU 40 sets the color of the rectangular parallelepiped to the color of the account with the highest priority out of the registered accounts with respect to each program information in which accounts are registered. More specifically, with respect to the program ID stored in the program registration data of the memory area 506, the account with the highest priority out of the registered accounts is specified on the basis of the priority table. In addition, the color corresponding to this account is specified on the basis of the account data in the memory area 508. Then, in the program guide controlling data of the memory area 514, the color of the rectangular parallelepiped of this program ID is set to a color corresponding to this account. After completion of the step S67, the process proceeds to a step S81.

On the other hand, if "NO" in the step S61, the CPU 40 determines whether or not the display flag 2 of the memory area 512 is turned on in a step S69. If "YES" in the step S69, that is, if the second size-enlarged display method is selected, the CPU 40 sets the virtual camera in the second size-enlarged display method in a step S71. This virtual camera is set to the first location. However, in this embodiment, an operation of scrolling the program guide and an operation of selecting the second size-enlarged display method are set to the same operation (pushing the B trigger switch 26i, for example), and therefore, the viewpoint and the gazing point are moved according to the scrolling operation. More specifically, on the basis of the vector connecting the coordinates of the designated position when a selecting operation of the second size-enlarged display method is performed and the coordinates of the current designated position, coordinates of the viewpoint and the gazing point are translated with respect to the front of the program guide 700.

On the other hand, if "NO" in the step S69, that is, if the display flag 3 is turned on, the CPU 40 sets the virtual camera in the size-reduced display method in a step S79. The virtual camera is set to the second location or the third location. More specifically, when the display method is switched to the size-reduced display method, the second location is selected. Then, in a case that the virtual camera is in the second location, when it is determined that the coordinates of the designated position are within the predetermined display area including the date tubs 702, the virtual camera is switched to the third location. In a case that the virtual camera is in the third location, it is determined that the coordinates of the designated position is out of the predetermined display area including the date tubs 702, the virtual camera is switched to the second location.

Then, the respective program information are depicted by the second depicting method. More specifically, in a step S73, the CPU 40 detects the number of registered accounts N on the basis of the program registration data with respect to each program information in which accounts are registered.

In a succeeding step S75, the CPU 40 forms a layered body of N pieces of rectangular parallelepipeds each having a predetermined height as program information in which accounts are registered. More specifically, in the program guide controlling data stored in the memory area 514, the number of rectangular parallelepipeds of each program information in which accounts are registered is set to the detected number N, and the height of each rectangular parallelepipeds is set to a predetermined value. The predetermined value of the height is decided in advance so as to take a value larger than the initial value in this embodiment. It should be noted that in a case that the number of the registered accounts is one, the number of rectangular parallelepipeds is one, but for the sake of convenience, this is also called a layered body.

Then, in a step S77, the CPU 40 sets the colors of the respective rectangular parallelepipeds to the colors of the accounts according to the order of the priorities from the top with respect to each of the program information in which accounts are registered. More specifically, in the program guide controlling data stored in the memory area 514, the colors of N pieces of the rectangular parallelepipeds each being brought into correspondence to the program ID of each program information in which accounts are registered are set to the colors of the registered accounts from the top according to the priorities. It should be noted that in a case that the number of registered accounts is one, the color of one rectangular parallelepiped is set to this account.

Succeedingly, in a step S81, the CPU 40 depicts a program guide on the basis of the program guide controlling data, etc. by utilizing the GPU 42b, etc. Thus, in a case that the display flag 1 is turned on, the two-dimensional program guide is depicted by the virtual camera at the first location. Then, in the program guide, each program information in which accounts are registered is depicted in a color of the account with the highest priority. Furthermore, in a case that the display flag 2 is turned on, the two-dimensional program guide is depicted by the virtual camera at the first location. Then, in the program guide, each program information in which accounts are registered is depicted such that the colors are layered in order of priority of the registered accounts. In a case that the display flag 3 is turned on, a three-dimensional program guide is depicted by the virtual camera at the second location or the third location. Then, in this program guide, each program information in which accounts are registered is depicted such that the colors are layered in order of priority of the registered accounts.

Then, in a step S83, the CPU 40 generates the image data of the screen combined with the depicted program guide, stamp 800, pointer 802, clock 814, and various buttons 804, 806, 808, 810 and 812, etc. by utilizing the GPU 42b, etc. in the VRAM 42d, and displays this screen on the monitor 34. After completion of the step S83, the program guide displaying processing is ended on the basis of the priority, and then, the process returns to the step S21 in FIG. 18.

In the step S21 in FIG. 18, the CPU 40 determines whether or not the program guide application is to be ended. For example, the button 804 is selected on the basis of the input data and the display position data of the button 804. If "NO" in the step S21, the process returns to the step S5. On the other hand, if "YES" in the step S21, this program guide application is ended.

According to this embodiment, priority is set to each of the plurality of accounts, and each program information is depicted on the basis of the priorities of the accounts registered in this program information. This makes it possible to depict the accounts registered in the program information according to the priorities in this program information. Furthermore, in the program guide, each program information is depicted on the basis of the priorities of the accounts registered in this program information. This makes it possible to readily display the accounts registered in the program information. Thus, it is possible to easily grasp the registration condition of the accounts with respect to the program information. Furthermore, even if a plurality of accounts are registered in the same program information, the registered accounts can be displayed in this program information in the program guide, and therefore, there is no problem of narrowing the display range of the program guide, and moreover, there is no disadvantage of being hard to intuitively grasp the positions on the program guide.

Furthermore, in the above-described embodiment, in the first depicting method, the program information is depicted in the display manner set to the account with the highest priority. However, in another embodiment, if a plurality of accounts are registered in the program information, the display area of this program information is divided by the number of registered accounts, and the respective divided areas may be depicted in the display manners according to the respective accounts in the order based on the priorities. For example, the display area of the program information is horizontally divided, and the respective areas may be depicted in colors of the respective accounts such that the priority is made low from left to right, or the display area of the program information is vertically divided, and the respective divided areas are depicted in colors of the accounts such that the priority is made low from top to bottom.

Additionally, in the above-described embodiments, the object representing the program information is formed by a rectangular parallelepiped, but this object may be a three-dimensional space in an appropriate shape. Accordingly, a layered body formed in a case of the second depicting method may also be formed by layering the three-dimensional objects. Or, in a case of the first depicting method, this object may be formed in a plane.

In addition, in each of the above-described embodiments, in a case of the size-reduced display method, the stamp 800 is not displayed as shown in FIG. 16 and FIG. 17, but in another embodiment, similar to the first and second size-enlarged display methods, the stamp 800 may be displayed, and by designating the stamp 800, the priority may be changed. In that case, in the display representing a daily program guide as a whole, it is possible to grasp the registration condition for the respective accounts in the entirely display of one day.

Furthermore, in each of the above-described embodiments, in a case of the size-reduced display method, only the second depicting method is performed, but in another embodiment, the first depicting method may also be performed. For example, when the display method is switched from the first size-enlarged display method to the size-reduced display method by a predetermined operation with the − button 26e, etc., the virtual camera is changed to the second location, and the program information is depicted in the first depicting method. Thereafter, by a predetermined operation with the B trigger switch 26i, etc., the program information may be depicted in the second depicting method.

In addition, in each of the above-described embodiments, each program information is depicted on the basis of the priorities of the respective accounts by making the users registered in the game apparatus 12 an object or target. However, in another embodiment, the result of the program registration by the user of another game apparatus 12 may also be displayed. More specifically, this another game apparatus 12 is called a second game apparatus 12. The game apparatus 12 communicates with the second game apparatus 12 over a network, and registers program registration data including the program ID registered in the second game apparatus 12. Furthermore, the game apparatus 12 sets an account with respect to the second game apparatus 12, sets the icon and display manner corresponding to this account, and adds the data in relation to this account to the account data memory area 508. On the screen, at the right side of the rightmost stamp 800, the icon of the second game apparatus 12 is displayed. However, this icon is not allowed to make a registration with respect to the program information unlike the stamp 800. In addition, the game apparatus 12 sets the priority to the account set to the second game apparatus 12, and adds the priority data of this account to the priority table memory area 510. For example, the lowest rank is applied as initial priority. In addition, the game apparatus 12 adds the program registration data of the second game apparatus 12 to the program registration data memory area 506. Thus, in the game apparatus 12, the program information can be depicted by dealing a program registration result by the accounts of this game apparatus 12 and a program registration result in another game apparatus 12 as the same level.

Although certain example embodiments have been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing computer executable instructions to be executed by a computing system of a program information displaying apparatus that is configured to display a plurality of program information in tabular form, the plurality of program information including a first program that is displayed, said computer executable instructions comprising instructions configured to:
   set respective priorities of a plurality of user information;
   accept user provided input that specifies the first program that is displayed among said plurality of program information that is displayed to the user;
   register of any one of said plurality of user information with respect to any one of said plurality of program information in accordance with the specified first program; and depict each program information, including the first program, on the basis of said priority of said user information registered in said program information, wherein different display manners are respectively set to said plurality of user information, and said program information is depicted in the display manner determined on the basis of said priority of said user information.

2. The medium of claim 1, wherein the instructions are further configured to:
display said plurality of user information as a plurality of corresponding icons, and
determine whether or not any one of said plurality of corresponding icons is designated; and
change said priority such that the priority of the user information corresponding to said designated icon is made highest when any one of the icons is designated.

3. The medium of claim 1, wherein said display manner is a color or a design.

4. The medium of claim 3, wherein said program information is depicted such that the display manners set to said respective user information are layered in order of the priority of the user information registered in said program information.

5. The medium of claim 3, wherein the instructions are further configured to select a depicting method of said program information, and
said program information is depicted in the display manner set to the user information with the highest priority out of the user information registered in said program information when a first depicting method is selected, and depicts said program information in such a manner that objects having the display manners set to said user information are layered in order of decreasing priority of the user information registered in said program information when a second depicting method is selected.

6. The medium of claim 5, wherein the instructions are further configured to form an object having the display manner set to said user information having the highest priority and being made equal in height to said other program information when said first depicting method is selected, and forms a layered body in which objects having display manners set to said user information are layered in order of the priority from a top as said program information in which said user information are registered when said second depicting method is selected.

7. The medium of claim 1, wherein said program information is depicted in the display manner set to the user information with the highest priority out of the user information registered in said program information.

8. The medium of claim 1, wherein prioritizing the plurality of user information includes prioritizing first user information that is associated with a first user above a remainder of user information of the plurality of user information, wherein the first user information is registered with the first program.

9. The medium of claim 1, wherein each respective program information is depicted in accordance with prioritized user information from among user information that is registered with respective program information.

10. The medium of claim 1, wherein program information in which a respective user information is registered is depicted in accordance with the priority of the respective user information amongst other user information that is registered to the program information.

11. A program information displaying apparatus for displaying a plurality of program information in tabular form, the apparatus comprising:
a processing system that includes at least one processor, the processing system configured to:
set respective priorities of a plurality of user information;
accept a user input selection of a first program information among any one of said plurality of program information that is displayed to the user;
store a registration of any one of said plurality of user information with respect to any one of said plurality of program information in accordance with the selected first program information; and
depict, to a display device, each program information in which said user information is registered on the basis of said priority of said user information registered in said program information,
wherein the depicted program information is displayed differently for different selected prioritizations of the plurality of user information.

12. A program information display method for displaying a plurality of program information in tabular form to a display device, the method comprising:
setting respective priorities of a plurality of user information;
accepting a user provided input that specifies any one of said plurality of program information that is displayed on the display device;
registering, via at least one processor, a registration of any one of said plurality of user information with respect to any one of said plurality of program information in accordance with the accepted user provided input; and
depicting, to the display device, each program information on the basis of said priority of said user information registered in said program information,
wherein the depicted program information is displayed differently for different selected prioritizations of users in the plurality of user information.

13. A program guide system for displaying program information, the system comprising:
a display device that is configured to display a program guide that includes a plurality of programming sections;
a non-transitory storage medium system configured to store a plurality of user profiles; and
a processing system that includes at least one processor, the processing system configured to:
accept user provided input via an input device, the user provide input indicating a first programming section among the plurality of displayed programming sections;
register a user profile of the plurality of user profiles with the first programming section from the plurality of programming sections in accordance with the accepted user provided input;
receive user input of a selected priority;
order the plurality of user profiles in accordance with the selected priority; and
output the first programming section of the programming guide to the display device in accordance with how the registered user profile is prioritized according to the ordered plurality of user profiles,
wherein the first programming section is depicted differently for different selected prioritizations of the order of the plurality of user profiles.

14. A non-transitory storage medium storing computer executable instructions to be executed by a computing system of a program information displaying apparatus that is configured to display a plurality of program information in tabular form, the plurality of program information including a first program that is displayed, said computer executable instructions comprising instructions configured to:

set respective priorities of a plurality of user information;

accept user provided input that specifies the first program that is displayed among said plurality of program information that is displayed to the user;

register of any one of said plurality of user information with respect to any one of said plurality of program information in accordance with the specified first program; and depict each program information, including the first program, on the basis of said priority of said user information registered in said program information, wherein:

the plurality of user information includes a first user and a second user, accepting user provided input that specifies the first program includes accepting user provided input from the first user and from the second user, receiving the registration of any one of said plurality of user information with respect to any one of said plurality of program information includes receiving a registration of the first user to the first program and receiving a registration of the second user to the first program based on the accepted user provided input, when the first user is prioritized over the second user, depict the first program in a first display manner in accordance with the priority of said user information registered in said program information, and when the second user is prioritized over the first user, depict the first program in a second display manner that is different from the first display manner in accordance with the priority of said user information registered in said program information.

* * * * *